(12) United States Patent
Shao et al.

(10) Patent No.: US 12,110,460 B2
(45) Date of Patent: Oct. 8, 2024

(54) METHOD AND APPARATUS FOR RECOVERING C2—C4 COMPONENTS IN METHANE-CONTAINING INDUSTRIAL GAS

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Huawei Shao, Beijing (CN); Dongfeng Li, Beijing (CN); Yi Zou, Beijing (CN); Zhixin Liu, Beijing (CN); Chunfang Li, Beijing (CN); Liang Guo, Beijing (CN); Jingsheng Zhang, Beijing (CN); Zhiyan Hu, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 358 days.

(21) Appl. No.: 17/755,418

(22) PCT Filed: Sep. 24, 2020

(86) PCT No.: PCT/CN2020/117451
§ 371 (c)(1),
(2) Date: Apr. 28, 2022

(87) PCT Pub. No.: WO2021/082825
PCT Pub. Date: May 6, 2021

(65) Prior Publication Data
US 2022/0389337 A1 Dec. 8, 2022

(30) Foreign Application Priority Data

Oct. 28, 2019 (CN) .......................... 201911030061.1
Oct. 28, 2019 (CN) .......................... 201911032377.4

(51) Int. Cl.
*C10L 3/00* (2006.01)
*B01D 53/00* (2006.01)
(Continued)

(52) U.S. Cl.
CPC ........... *C10G 70/06* (2013.01); *B01D 53/002* (2013.01); *B01D 53/1406* (2013.01);
(Continued)

(58) Field of Classification Search
CPC ........ C10G 70/06; C10G 70/046; C10G 5/04; C10G 5/06; F25J 2205/50; F25J 2210/04;
(Continued)

(56) References Cited

U.S. PATENT DOCUMENTS 2,782,141 A   2/1957   King
4,740,222 A   4/1988   Mehra
(Continued)

FOREIGN PATENT DOCUMENTS

CN   101638584 A   2/2010
CN   101353286 B   12/2011
(Continued)

OTHER PUBLICATIONS

Leading official patent examiner; Office Action for Application No. 2022114343; Gorodissky Intellectual Property TMT; pp. 1-6.
(Continued)

*Primary Examiner* — Minh Chau T Pham
(74) *Attorney, Agent, or Firm* — NKL Law; Allen Xue

(57) ABSTRACT

A method for recovering C2 components in a methane-containing industrial gas includes the steps of (1) cooling a
(Continued)

compressed methane-containing industrial gas and performing gas-liquid separation; (2) absorbing C2 components in the gas phase by using an absorbent to obtain an absorption rich liquid; (3) returning the absorption rich liquid to the compression in step (1) or mixing the absorption rich liquid with the liquid phase obtained in step (1) to obtain a mixed liquid, and depressurizing the mixed liquid or the absorption rich liquid; (4) performing methane desorption on the depressurized stream to obtain a rich absorbent, or performing second gas-liquid separation on the depressurized stream, followed by methane desorption on the second liquid phase to obtain a rich absorbent; and (5) desorbing and separating the rich absorbent to obtain a lean absorbent and an enriched gas, and recycling and reusing the lean absorbent.

27 Claims, 2 Drawing Sheets

(51) Int. Cl.
| | | |
|---|---|---|
| *B01D 53/14* | (2006.01) | |
| *B01D 53/18* | (2006.01) | |
| *C10G 5/04* | (2006.01) | |
| *C10G 5/06* | (2006.01) | |
| *C10G 70/04* | (2006.01) | |
| *C10G 70/06* | (2006.01) | |
| *C10L 3/10* | (2006.01) | |
| *F25J 3/06* | (2006.01) | |

(52) U.S. Cl.
CPC ..... *B01D 53/1418* (2013.01); *B01D 53/1425* (2013.01); *B01D 53/1431* (2013.01); *B01D 53/1487* (2013.01); *B01D 53/18* (2013.01); *C10G 5/04* (2013.01); *C10G 5/06* (2013.01); *C10G 70/046* (2013.01); *F25J 3/064* (2013.01); *B01D 2252/205* (2013.01); *F25J 2205/04* (2013.01); *F25J 2205/50* (2013.01); *F25J 2210/04* (2013.01); *F25J 2230/30* (2013.01)

(58) Field of Classification Search
CPC ...... F25J 2230/30; F25J 3/064; B01D 53/002; B01D 53/1406; B01D 53/1418; B01D 53/1425; B01D 53/1431; B01D 53/1487; B01D 53/18; B01D 2252/04; B01D 2257/7025
USPC ............ 96/108, 5; 95/44, 96, 130, 114, 138, 95/143, 144, 148
See application file for complete search history.

(56) References Cited

U.S. PATENT DOCUMENTS

| | | | |
|---|---|---|---|
| 5,202,521 | A | 4/1993 | Brown et al. |
| 10,052,581 | B1 | 8/2018 | Montalbano et al. |
| 2009/0156875 | A1* | 6/2009 | Tomioka ............ B01D 53/1487 96/5 |
| 2013/0108531 | A1* | 5/2013 | Mitariten ................ C10L 3/104 95/138 |
| 2014/0060326 | A1* | 3/2014 | Sundaram .......... B01D 53/0446 95/143 |

FOREIGN PATENT DOCUMENTS

| | | |
|---|---|---|
| CN | 101759516 B | 8/2012 |
| CN | 103588604 A | 2/2014 |
| CN | 103727742 A | 4/2014 |
| CN | 103159581 B | 9/2015 |
| CN | 105441130 A | 3/2016 |
| CN | 106609161 A | 5/2017 |
| CN | 107560319 A | 1/2018 |
| CN | 109553504 A | 4/2019 |
| CN | 109748771 A | 5/2019 |
| CN | 109749780 A | 5/2019 |
| IN | 105037069 A | 11/2015 |
| RU | 2338734 C1 | 11/2008 |
| WO | 9715639 A1 | 5/1997 |

OTHER PUBLICATIONS

Leading official patent examiner; Federal Service on Intellectual Property Search Report for Application No. 2022114343; Gorodissky Intellectual Property TMT; pp. 1-2.

* cited by examiner

METHOD AND APPARATUS FOR RECOVERING C2—C4 COMPONENTS IN METHANE-CONTAINING INDUSTRIAL GAS

FIELD OF THE INVENTION

The present invention relates to the technical field of methane desorption and C2-C4 component recovery from a methane-containing industrial gas, including but not limited to the technical field of dry gas treatment. Specifically, the present invention relates to a method and apparatus for recovering C2-C4 components in a methane-containing industrial gas such as dry gas, in particular to a method and apparatus for recovering C2 components in a methane-containing industrial gas such as dry gas, and a method and apparatus for recovering C2 and C3 components in a methane-containing industrial gas such as dry gas.

BACKGROUND OF THE INVENTION

At present, the already industrialized methods for recovering C2 components (ethane, ethylene) from dry gas or methods for recovering C2 and C3 components from dry gas mainly include:

(1) Cryogenic separation method, which is mature in process, achieves a high recovery rate and a high purity for ethylene, but requires a dryer and a propylene refrigeration apparatus or an ethylene-propylene composite refrigeration apparatus, which apparatus requires a large investment and high energy consumption;

(2) Pressure swing adsorption method, which is simple in operation, generally requires a low energy consumption, but achieves a low product purity, and a low recovery rate for C2 components, and whose apparatus requires a large investment and space occupation when the raw material dry gas treatment is large on scale;

(3) Shallow cold oil absorption method, which has a safe and reliable process flow, achieves a high recovery rate for C2 and C3 components, and has no requirement for sulfur content and water content in the raw gas, but in which method, the tower kettle reboiler of the absorption tower (or methane desorption tower) bears a large load, and low-pressure steam is consumed in a large amount during the whole process. U.S. Ser. No. 10/052,581B1 discloses a process for recovery of steam cracker feed from FCC dry gas. In this process, the FCC dry gas is first subjected to an operation of elution of $CO_2$, $H_2S$, COS with amine, and then to a hydrodealkyne operation. After the above refining process, the FCC dry gas is passed into a pressure swing adsorption tower to remove the methane, hydrogen and other light components therein, and then goes through a series of separation processes to finally obtain the steam cracker feed stream mainly composed of ethane and ethylene. In this process, since the pressure swing adsorption tower may have a working condition lower than 0° C. during the operation process, in order to avoid freezing, it is necessary to perform cooling, phase separation as well as dehydration and drying treatment before the dry gas is passed into the pressure swing adsorption tower, so the apparatus requires a relatively large investment.

CN101759516B discloses a process for separating a catalytic dry gas in a refinery by an oil absorption method. The process includes dry gas compression, absorption (re-absorption), desorption and other processes. In the main absorption tower, C5 fraction or depentanized oil is used as the absorbent to absorb the C2 fraction and heavier components in the catalytic dry gas, C5-rich absorbent is delivered to a desorption tower, and recovered C2 concentrated gas is obtained from the top of the desorption tower. The operation pressure of the main absorption tower is 3.5-5.5 MPaG, the temperature of the tower kettle is 95-115° C., the operation pressure of the desorption tower is 2-3 MPaG, the temperature of the tower kettle is 145-165° C., and low-pressure steam needs to be used as the heat source.

CN103159581B discloses a apparatus for recovering C2 in a refinery dry gas by a combined absorption method, comprising a compressor, a pretreatment unit, a refinery dry gas cooling unit, an absorption unit and a rectification unit. The absorption unit comprises a gas-liquid separation tank, a C2 absorption tower and a methane desorption tower, and the rich absorbent that absorbs the C2 components in the dry gas is separated into C2 and absorbent components at the C2 removal tower. The operation pressure of the C2 absorption tower is 2.5-3.0 MPaG, the operation pressure of the methane desorption tower is 2.5-3.1 MPaG, and the operation pressure of the C2 removal tower is 2.2-2.6 MPaG. The methane desorption tower needs to use a heat source of about 120° C. in the refinery.

CN109553504A discloses a method and a apparatus for recycling saturated dry gas of a refinery plant by adopting shallow cold oil absorption technology. The method comprises: compressing and cooling the saturated dry gas in sequence, followed by delivery to a C4 absorption tower for treatment, and delivery of the obtained gas phase and liquid phase to a gasoline absorption tower and a C4 desorption tower; recovering the gas phase obtained by treatment by the C4 desorption tower as the C2 enriched gas product, and returning most of the obtained liquid phase to the C4 absorption tower for recycling; delivering the liquid phase obtained by treatment by the gasoline absorption tower to a gasoline stabilization tower for treatment, returning most of the liquid phase as obtained to the gasoline absorption tower for recycling, subjecting the gas phase obtained by treatment by the gasoline stabilization tower to condensation and gas liquid separation treatment in sequence, regarding the obtained gas phase and liquid phase respectively returning to an inlet of the compressor and delivering to the gasoline stabilization tower and C4 absorption tower for treatment. Two times of absorption-desorption are performed and low-pressure steam is used as the heat source.

CN106609161B discloses a method for separating refinery plant saturated dry gas. The saturated dry gas is subjected to compression and cooling and then to gas-liquid phase separation, the compressed dry gas is delivered to an absorption tower wherein C4 fraction is used as an absorbent to absorb the C2 and heavier components in the dry gas. The absorption tower kettle liquid is delivered to a C4 desorption tower for treatment, and C2 enriched gas is obtained from the C4 desorption tower, and the C4 desorption tower kettle liquid is returned to the C4 absorption tower for recycling. The total recovery rate of C2 and C3 in this process can reach 93%, the pressure of the C4 absorption tower is 3-4.5 MPaG, the temperature of the tower kettle of the C4 absorption tower is 100-160° C.; the pressure of the C4 desorption tower is 2.5-3.5 MPaG, the temperature of the tower kettle of the C4 desorption tower is 100-160° C. Both the C4 absorption tower and the C4 desorption tower need to use low-pressure steam or 145° C. hot oil outside battery limit as the heat source of the tower kettle reboiler, thus the apparatus consumes a relatively large amount of energy.

CN101759516B discloses a method for separating a catalytic dry gas in a refinery by an oil absorption method. The method includes dry gas compression, absorption (re-absorption), desorption and other processes. In the main absorption tower, C5 fraction or depentanized oil is used as the absorbent to absorb the C2 fraction and heavier components in the catalytic dry gas, C5-rich absorbent is delivered to a desorption tower, and recovered C2 concentrated gas is obtained from the top of the desorption tower. The operation pressure of the main absorption tower is 3.5-5.5 MPaG, the temperature of the tower kettle is 95-115° C., the operation pressure of the desorption tower is 2-3 MPaG, the temperature of the tower kettle is 145-165° C., and low-pressure steam needs to be used as the heat source.

CN101353286B discloses a non-cryogenic separation method for lower hydrocarbon containing light gas, wherein the pretreated light gas is cooled to 10° C.~−37° C., and then fed to a pre-cutting column, the top of the pre-cutting column is light components such as methane and a part of C2 and a small amount of C3, and the bottom of the pre-cutting column is the rest C2 and heavier components, the top gas of the pre-cutting column is fed to an absorption column, where C3, C4, C5 and other hydrocarbons are used as absorbent to absorb the C2 in the top gas of the pre-cutting column. This process has no cryogenic cold box and demethanizer, and does not require cryogenic separation of methane, thus consumes less energy than traditional cryogenic separation. However, during the process, a propylene refrigerant of about −60° C. is still required, and the raw gas also needs to be dried and dehydrated; and at the same time, the recovered C2 components have a low purity.

To sum up, when recovering C2 components or C2 and C3 components in a dry gas, in order to ensure the purity of the product gas and the recovery rate of C2 or C2 and C3, the existing process generally adopts a cryogenic/intercooling separation route, wherein the raw gas needs to be dried and dehydrated and the apparatus requires a large investment, or a shallow cold oil absorption route, wherein generally the oil absorption and methane desorption processes need to be carried out under a higher pressure, the reboiler in the methane desorption process consumes a large amount of steam and has a large load, and the apparatus has a higher energy consumption.

SUMMARY OF THE INVENTION

The object of the present invention is to provide a new method and apparatus for recovering C2-C4 components (including but not limited to C2 components or C2 and C3 components or C2, C3 and C4 components) from a methane-containing industrial gas such as dry gas. The C2-C4 components (including but not limited to C2 components or C2 and C3 components or C2, C3 and C4 components) recovered by the method and apparatus have a high purity and a high recovery rate, energy consumption of the apparatus is saved, and dryers and propylene refrigeration compressors are not required. In the present invention, the methane-containing industrial gas includes but is not limited to dry gas, cracked gas, natural gas, shale gas, etc., wherein the dry gas is preferably at least one selected from the group consisting of refinery dry gas and coal chemical dry gas.

In a first aspect, the present invention provides a method for recovering C2 components in a methane-containing industrial gas, the method comprising the following steps:
(1) compressing a raw material methane-containing industrial gas, and cooling the obtained compressed gas prior to performing gas-liquid separation, to obtain a gas phase and a liquid phase;
(2) contacting the gas phase with an absorbent to absorb the C2 components to obtain an absorption tail gas and an absorption rich liquid, wherein, the absorption rich liquid is returned and mixed into the compressed gas, or a mixed liquid of the absorption rich liquid and the liquid phase obtained in step (1) or the absorption rich liquid is used as a first stream;
(3) depressurizing the liquid phase obtained in step (1) or the first stream obtained in step (2);
(4) subjecting the depressurized stream in step (3) to methane desorption to obtain a desorbed gas and a rich absorbent, and returning the desorbed gas to the compression in step (1) or discharging it externally, or subjecting the depressurized stream in step (3) to a second gas-liquid separation to obtain a second gas phase and a second liquid phase, returning the second gas phase to the compression in step (1), subjecting the second liquid phase to methane desorption to obtain a desorbed gas and a rich absorbent, and returning the desorbed gas to the compression in step (1) or discharging it externally;
(5) subjecting the rich absorbent to desorption separation to obtain a lean absorbent and an enriched gas containing C2 components, the lean absorbent being returned and mixed into the absorbent in step (2).

In a specific embodiment of the present invention, in the step (2) of the method of the present invention, the absorption rich liquid is returned and mixed into the compressed gas, and the liquid phase obtained in the step (1) is depressurized and then subjected to methane desorption to obtain a desorbed gas and a rich absorbent.

In a specific embodiment of the present invention, in the method of the present invention, the first stream obtained in step (2) is depressurized and then subjected to a second gas-liquid separation to obtain a second gas phase and a second liquid phase, and the second liquid phase is subjected to methane desorption to obtain a desorbed gas and a rich absorbent.

Preferably, in step (2), the absorbent is selected from the group consisting of C4 fractions and/or C5 fractions, the C4 fractions comprise at least one of n-butane, isobutane and butene, the C5 fractions comprise at least one of n-pentane, isopentane and neopentane, and C4 fraction is preferred.

Preferably, the C2 components comprise ethane and/or ethylene.

The method according to the present invention may also comprise recovering C3 components, preferably the C3 components comprise propane and/or propylene.

The method according to the present invention may comprise recovering C2 and C3 components, preferably the C2 and C3 components comprise ethane and/or ethylene, and propane and/or propylene.

The method according to the invention may also comprise recovering C4 components, preferably the C4 components comprise butane and/or butene.

In a second aspect, the present invention provides a apparatus for recovering C2 components in a methane-containing industrial gas, the apparatus comprising: a compressor, a cooler, a liquid separation tank, an absorption tower, a methane desorption tower and a desorption tower; the compressor is connected to a pipeline of a methane-containing industrial gas, and the compressor, the cooler and the liquid separation tank are connected in sequence;

the absorption tower has its bottom respectively connected to the top of the liquid separation tank and the cooler, for contacting the gas phase discharged from the top of the liquid separation tank with an absorbent in countercurrent, an absorption tail gas is discharged from the top of the absorption tower, and an absorption rich liquid is discharged from the tower kettle of the absorption tower and returned to the cooler;

the methane desorption tower has its upper part, top and bottom respectively connected to the bottom of the liquid separation tank, the compressor and a middle part of the desorption tower, for methane desorption of the liquid phase discharged from the bottom of the liquid separation tank after depressurization, a desorbed gas is discharged from the top of the methane desorption tower and returned to an inlet or interstage of the compressor or discharged externally, and a rich absorbent is discharged from the tower kettle of the methane desorption tower and then passed into the middle part of the desorption tower for desorption separation;

the desorption tower has its bottom connected to the top of the absorption tower, wherein a lean absorbent is discharged from the tower kettle of the desorption tower and is returned to the top of the absorption tower, and an enriched gas comprising C2 components, such as C2 and C3 components, is recovered from the top of the desorption tower.

In a third aspect, the present invention provides a apparatus for recovering C2 components in a methane-containing industrial gas, the apparatus comprising: a compressor, a cooler, a first liquid separation tank, an absorption tower, a second liquid separation tank, a methane desorption tower and a desorption tower;

the compressor is connected to a pipeline of a methane-containing industrial gas, and the compressor, the cooler and the first liquid separation tank are connected in sequence;

the absorption tower has its bottom respectively connected to the top of the first liquid separation tank and a middle part of the second liquid separation tank, for contacting the first gas phase discharged from the top of the first liquid separation tank with an absorbent in countercurrent, an absorption tail gas and an absorption rich liquid are respectively discharged from the top and tower kettle of the absorption tower, a mixed liquid of the absorption rich liquid and a first liquid phase discharged from the bottom of the first liquid separation tank or the absorption rich liquid is used as a first stream, and the first stream is depressurized and then passed into the middle part of the second liquid separation tank for a second gas-liquid separation;

the second liquid separation tank has its top and bottom respectively connected to the compressor and the upper part of the methane desorption tower, wherein a second gas phase is discharged from the top of the second liquid separation tank and returned to an inlet or interstage of the compressor, and a second liquid phase is discharged from the bottom of the second liquid separation tank and passed into the upper part of the methane desorption tower for methane desorption;

the methane desorption tower has its top and bottom respectively connected to the compressor and a middle part of the desorption tower, wherein a desorbed gas is discharged from the top of the methane desorption tower and returned to the inlet or interstage of the compressor or discharged externally, and a rich absorbent is discharged from the tower kettle of the methane desorption tower and passed into the middle part of the desorption tower for desorption separation;

the desorption tower has its bottom connected to the top of the absorption tower, wherein a lean absorbent is discharged from the tower kettle of the desorption tower and is returned to the top of the absorption tower, and an enriched gas comprising C2 components, such as C2 and C3 components, is recovered from the top of the desorption tower.

The apparatus according to the present invention may further comprise a methane desorption tower reboiler.

Preferably, the C2 components comprise ethane and/or ethylene.

The apparatus according to the present invention may also recover C3 components, preferably the C3 components comprise propane and/or propylene.

The apparatus according to the present invention recovers C2 and C3 components, preferably the C2 and C3 components comprise ethane and/or ethylene, and propane and/or propylene.

The apparatus according to the invention may also recover C4 components, preferably the C4 components comprise butane and/or butene.

DETAILED DESCRIPTION OF THE INVENTION

Figure 1:
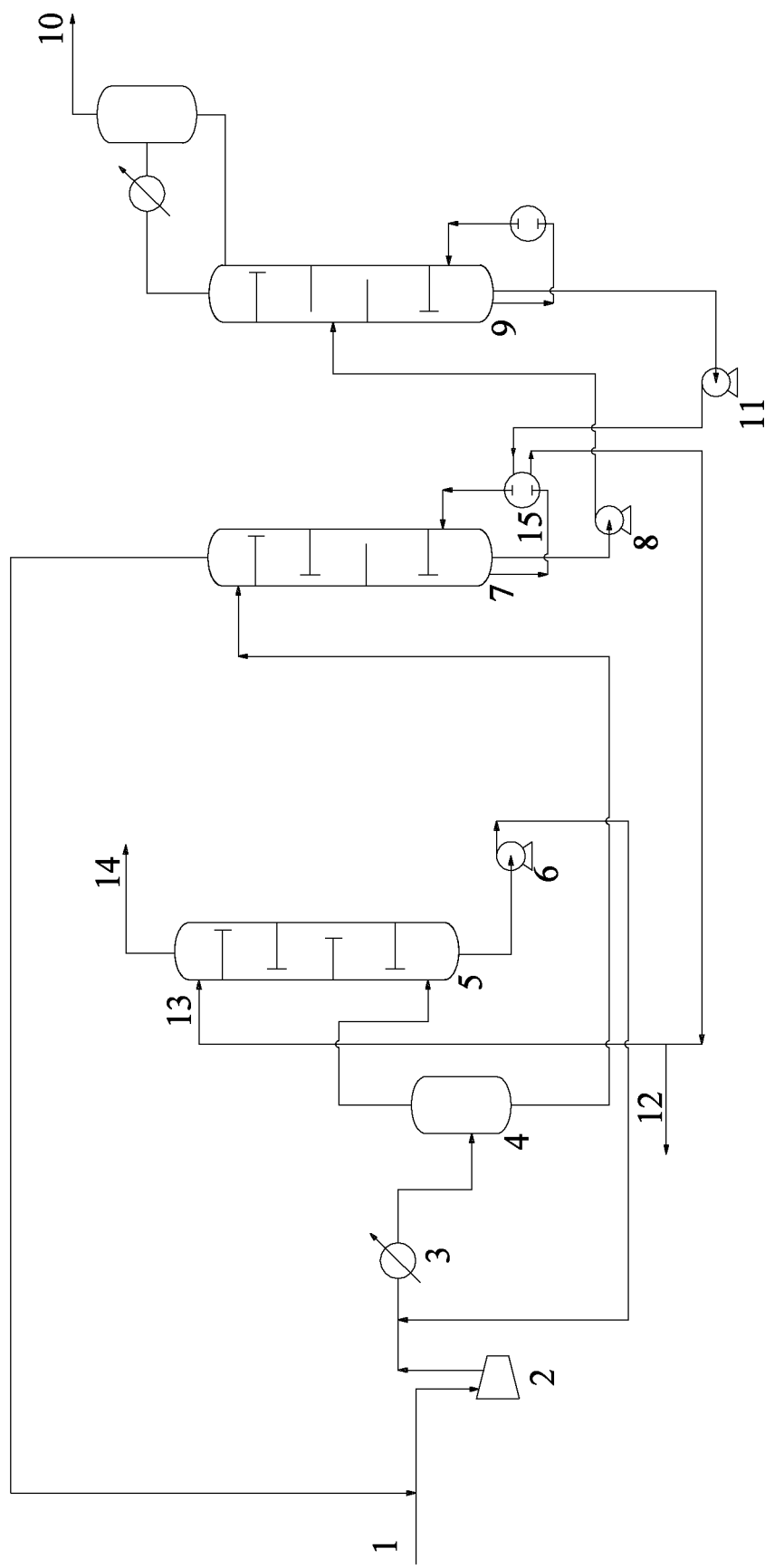
FIG. 1 is a schematic diagram of the apparatus for recovering C2 components in a methane-containing industrial gas such as dry gas as provided by the present invention, wherein: description of reference signs: 1. Raw material methane-containing industrial gas such as dry gas; 2. Compressor; 3. Cooler; 4. Liquid separation tank; 5. Absorption tower; 6. Absorption tower kettle liquid pump; 7 Methane desorption tower; 8. Rich absorbent pump; 9. Desorption tower; 10. Enriched gas containing C2 components; 11. Absorbent circulating pump; 12. Light hydrocarbon components; 13. Stream; 14. Absorption tail gas; 15. Methane desorption tower reboiler.

The specific embodiments of the present invention will be described in detail below with reference to the drawings. It should be understood that the specific embodiments described herein are only used to illustrate and explain the present invention, but not to limit the present invention.

The inventors of the present invention have found through study that, by subjecting the raw material methane-containing industrial gas, such as dry gas, to absorption treatment under a high pressure and to methane desorption treatment and absorbent desorption treatment successively under a low pressure, the obtained enriched gas product has a high purity, C2-C4 components, such as C2 components, C2 and C3 components, C2, C3 and C4 components, have a high recovery rate, in the methane desorption process the tower kettle reboiler bears a low load and the tower kettle temperature is low, and this part of heat energy can be completely provided by the lean absorbent discharged from the tower kettle of the desorption tower in the apparatus, thereby reducing steam consumption, taking into an overall consideration of energy consumption increasing effect caused by returning the top desorbed gas of the methane desorption tower to the compressor and energy consumption reducing effect due to the non-consumption of steam by the methane desorption tower kettle reboiler, and selecting optimized process flow and operating parameters, so that the overall energy consumption of the apparatus is minimized, and no dryer and propylene refrigeration compressor are required.

The inventors of the present invention have also found through study that, the present invention is suitable for a process of treating a methane-containing industrial gas with the methane to be desorbed. Through independent running and combined operation of the high-pressure absorption process and the low-pressure methane desorption process, methane can be effectively removed with the lowest consumption of energy and consumption of materials such as absorbents, thereby achieving a high recovery rate for the C2, C3, C4 and other components from the methane-containing industrial gas. Compared with the conventional shallow cold oil absorption process, under the circumstance that the recovery rate for C2-C4 components, such as C2, C2 and C3, and C2, C3 and C4, and other components, can reach about 95% or more, the overall energy consumption of the apparatus of the present invention can be reduced by about 10%-30% depending on the composition of the raw material.

In the present invention, the term "methane-containing industrial gas" refers to such a methane-containing industrial gas that methane can be desorbed from the methane-containing industrial gas with the methane to be desorbed by means of a methane desorption tower, which industrial gas is then subjected to subsequent treatment to recover C2, C3, C4 and other components therefrom, including but not limited to dry gas, cracked gas, natural gas, shale gas, etc. In the present invention, there are no specific limitations and requirements on the components and their contents of the raw material methane-containing industrial gas. As long as the methane contained in the raw material methane-containing industrial gas is desorbed by the methane desorption tower to achieve the separation from C2-C4, the purpose of recovering the C2, C3, C4 and other components with a high recovery rate and of minimizing the total energy consumption can be achieved by adjusting the process flow and operating parameters.

The dry gas is not particularly limited, for example, the dry gas is at least one selected from the group consisting of refinery dry gas and coal chemical dry gas. Specifically, the refinery dry gas is at least one selected from the group consisting of catalytic cracker dry gas, delayed coker dry gas, PSA apparatus desorbed gas and light hydrocarbon recovery unit dry gas, and the coal chemical dry gas is at least one selected from the group consisting of methanol-to-olefins (MTO) dry gas and methanol-to-aromatics (MTA) dry gas. The dry gas in the present invention is not limited to the above. There is no particular limitation on the cracked gas, natural gas, and shale gas, for example, cracked gas includes catalytic cracked gas and steam cracked gas.

According to a preferred embodiment of the present invention, when the methane-containing industrial gas comprises C6 or heavier components (i.e. components having 6 or more carbon atoms) in an amount of less than 0.1% mol, for example, the dry gas includes a refinery dry gas with C6 or heavier components in an amount of less than 0.1% mol, it is more conducive to the recovery of C2 components in the dry gas and to the lowest overall energy consumption of the apparatus.

According to a preferred embodiment of the present invention, when the methane-containing industrial gas comprises C6 or heavier components in an amount of greater than 0.1% mol, for example, the dry gas includes a refinery dry gas with C6 or heavier components in an amount of greater than 0.1% mol, it is more conducive to the recovery of C2 and C3 components in the dry gas and to the lowest overall energy consumption of the apparatus.

In the present invention, unless otherwise specified, the pressure is gauge pressure.

In a first aspect, the present invention provides a method for recovering C2 components in a methane-containing industrial gas, the method comprising the following steps:

(1) compressing the raw material methane-containing industrial gas, and cooling the obtained compressed gas prior to performing gas-liquid separation, to obtain a gas phase and a liquid phase;

(2) contacting the gas phase with an absorbent to absorb the C2 components to obtain an absorption tail gas and an absorption rich liquid, wherein, the absorption rich liquid is returned and mixed into the compressed gas, or a mixed liquid of the absorption rich liquid and the liquid phase obtained in step (1) or the absorption rich liquid is used as a first stream;

(3) depressurizing the liquid phase obtained in step (1) or the first stream obtained in step (2);

(4) subjecting the depressurized stream in step (3) to methane desorption to obtain a desorbed gas and a rich absorbent, and returning the desorbed gas to the compression in step (1) or discharging it externally, or subjecting the depressurized stream in step (3) to a second gas-liquid separation to obtain a second gas phase and a second liquid phase, returning the second gas phase to the compression in step (1), subjecting the second liquid phase to methane desorption to obtain a desorbed gas and a rich absorbent, and returning the desorbed gas to the compression in step (1) or discharging it externally;

(5) subjecting the rich absorbent to desorption separation to obtain a lean absorbent and an enriched gas comprising C2 components, for example, C2 and C3 components, the lean absorbent being returned and mixed into the absorbent in step (2).

In a specific embodiment of the present invention, in the step (2) of the method of the present invention, the absorption rich liquid is returned and mixed into the compressed gas, and the liquid phase obtained in the step (1) is depressurized and then subjected to methane desorption to obtain a desorbed gas and a rich absorbent.

In a specific embodiment of the present invention, the present invention provides a method for recovering C2 components in a methane-containing industrial gas, the method comprising the following steps:

(1) compressing the raw material methane-containing industrial gas, and cooling the obtained compressed gas prior to performing gas-liquid separation, to obtain a gas phase and a liquid phase;

(2) contacting the gas phase with an absorbent to absorb the C2 components to obtain an absorption tail gas and an absorption rich liquid, returning the absorption rich liquid and mixing it into the compressed gas;

(3) depressurizing the liquid phase obtained in step (1);

(4) subjecting the depressurized stream in step (3) to methane desorption to obtain a desorbed gas and a rich absorbent, and returning the desorbed gas to the compression in step (1) or discharging it externally;

(5) subjecting the rich absorbent to desorption separation to obtain a lean absorbent and an enriched gas comprising C2 components, for example, C2 and C3 components, the lean absorbent being returned and mixed into the absorbent in step (2).

Step (1) Gas-Liquid Separation of a Methane-Containing Industrial Gas after Compression and Cooling According to the present invention, there is no particular limitation on the compression, and generally stage-by-stage compression is adopted to increase the pressure of the raw material methane-containing industrial gas to 2.5-4.6 MPaG, preferably 3-4.2 MPaG, that is, the pressure of the compressed gas is 2.5-4.6 MPaG, preferably 3-4.2 MPaG. Further preferably, the compression is a multi-stage compression, and in the present invention, there is no particular limitation on the stage number of the compression processing, for example, the compression can be a two-stage compression or a three-stage compression.

According to the present invention, the cooling is not particularly limited, preferably, temperature of the cooling is 5-40° C., preferably 10-20° C. In the present invention, a cooling medium having a temperature of 0° C. or higher is used to cool the compressed gas, and the cooling medium is at least one selected from the group consisting of low-temperature water, circulating water, propylene, ammonia and liquid nitrogen, preferably low-temperature water; further preferably, the low-temperature water is prepared by a lithium bromide absorption refrigerator and has a temperature of 5° C. or 7° C. Specifically, low-temperature water at 7° C. is used in the examples, but the present invention is not limited thereto.

According to the present invention, preferably, the cooled compressed gas is subjected to gas-liquid separation to obtain a gas phase and a liquid phase, wherein the gas phase is mainly composed of light components such as hydrogen and C1-C3 hydrocarbons, and the liquid phase is mainly composed of heavy components such as C3-C5 hydrocarbons.

Step (2) Contact of the Gas Phase with an Absorbent to Absorb C2 Components

According to the present invention, the absorbent is not particularly limited, and can be determined by a person skilled in the art according to common knowledge in the prior art. Preferably, the absorbent is selected from C4 fractions and/or C5 fractions, the C4 fractions comprise at least one of n-butane, isobutane and butene, the C5 fractions comprise at least one of n-pentane, isopentane and neopentane, C4 fraction is preferred. Specifically, mixed butane is used as the absorbent in the examples, but the present invention is not limited thereto.

Preferably, the C2 components are selected from ethane and/or ethylene, for example, ethane, ethylene, a mixture of ethane and ethylene.

According to the present invention, preferably, absorption of the C2 components is carried out in an absorption tower, more preferably, the theoretical plate number of the absorption tower is 15-30, the operation pressure of the absorption tower is 2.5-4.6 MPaG, preferably 3-4.2 MPaG, the tower top temperature of the absorption tower is 10-60° C., and the tower kettle temperature of the absorption tower is 10-70° C.

For example, in a specific embodiment, the temperature of the absorbent entering the tower is 40-50° C., the temperature of the gas phase entering the tower is about 40° C., the cooling medium in step (1) is circulating water, then the tower top temperature of the absorption tower is 40-60° C.; in another embodiment, the temperature of the absorbent entering the tower is 5-20° C., the temperature of the gas phase entering the tower is 5-20° C., the cooling medium in step (1) is low-temperature water, then the tower top temperature of the absorption tower is 10-30° C.

According to a specific embodiment of the present invention, the gas phase is fed into the bottom of the absorption tower to be in countercurrent contact with the absorbent at the top of the absorption tower, thereby C2 components and heavier fractions in the gas phase are absorbed, the absorption tail gas is discharged from the top of the absorption tower and sent out of the boundary area, and the absorption rich liquid is discharged from the tower kettle of the absorption tower, pressurized by the absorption tower kettle liquid pump and then returned to be mixed with the compressed gas.

In the present invention, the absorption rich liquid discharged from the tower kettle of the absorption tower is fully contacted with the compressed gas in the liquid separation tank, and absorbs a part of the C2-C4 hydrocarbons and other heavy components therein in advance, thereby reducing the amount of gas phase entering the absorption tower, reducing the amount of the absorbent used in the absorption tower and saving energy consumption.

According to a preferred embodiment of the present invention, before being returned to the cooler, the absorption rich liquid is first passed into a water cooler to be cooled down, thereby reducing load of the cooler and saving energy consumption.

Step (3) Depressurizing the Liquid Phase

According to the present invention, preferably, the pressure of the liquid phase after depressurization is 0.8-3 MPaG, further preferably 1-2 MPaG, wherein, the pressure of the liquid phase after depressurization is higher than operation pressure of the methane desorption tower so as to ensure that the liquid phase can flow into upper part of the methane desorption tower by itself under the action of the pressure difference.

In the present invention, the depressurization is not particularly limited. Generally, the pressure of the liquid phase is reduced by the manner of flash evaporation, to thereby increase relative volatility among the C1-C5 hydrocarbon components, so that the reboiler of the methane desorption tower bears a lower load and the tower kettle temperature of the methane desorption tower is lowered, thus a heat source with lower-temperature level can be used, and steam consumption and energy consumption of the apparatus are saved.

Step (4) Subjecting the Stream after Liquid Phase Depressurization to Methane Desorption According to the present invention, preferably, the methane desorption is carried out in a methane desorption tower, more preferably, the theoretical plate number of the methane desorption tower is 20-50, the operation pressure of the methane desorption tower is 0.5-2.4 MPaG, the tower top temperature of the methane desorption tower is 10-60° C., and the tower kettle temperature of the methane desorption tower is 35-90° C.

In a preferred embodiment, the operation pressure of the methane desorption tower is 1.0-1.9 MPaG.

In a preferred embodiment, the tower top temperature of the methane desorption tower is 10-20° C.

In a preferred embodiment, the tower kettle temperature of the methane desorption tower is 40-75° C.

According to the present invention, preferably, after depressurization, the liquid phase is passed into the methane desorption tower for separation and removal of light components such as methane in the liquid phase, thereby obtaining a desorbed gas and a rich absorbent, and the desorbed gas is returned and mixed into the raw material methane-containing industrial gas.

According to the present invention, preferably, the desorbed gas discharged from the top of the methane desorption tower is returned to an inlet or interstage of the compressor, and the return position can be determined according to the pressure of the raw material methane-containing industrial gas, the inter-stage pressure of the compressor and the pressure of the methane desorption tower. While ensuring that the top gas of the methane desorption tower can be pressurized by the compressor, energy consumption of the compressor shall be saved as much as possible.

In the present invention, the methane desorption tower is operated at a low pressure to distill out methane in the absorption rich liquid at a small cost, thereby reducing methane content in the product enriched gas containing C2 components. The kettle liquid of the methane desorption tower is subjected to absorbent desorption treatment to obtain a lean absorbent.

According to the present invention, preferably, heat source of the tower kettle of the methane desorption tower is provided by the reboiler of the methane desorption tower, and heat source of the reboiler of the methane desorption tower is a process stream. Specifically, the process stream is at least one selected from the group consisting of the absorbent, the rich absorbent and the lean absorbent, preferably the lean absorbent.

Step (5) Subjecting the Rich Absorbent to Desorption Separation

According to the present invention, preferably, the desorption separation is carried out in a desorption tower, more preferably, the theoretical plate number of the desorption tower is 20-50, the operation pressure of the desorption tower is 1-2.8 MPaG, the tower top temperature of the desorption tower is 25-70° C., and the tower kettle temperature of the desorption tower is 90-160° C.

According to a preferred embodiment of the present invention, the rich absorbent is desorbed and separated in a desorption tower, an enriched gas containing C2 components is recovered from the top of the desorption tower, a lean absorbent is discharged from the tower kettle of the desorption tower, the lean absorbent is used as the heat source of the methane desorption, and at least a portion of the stream obtained after heat exchange is returned and mixed into the absorbent.

According to the present invention, preferably, a portion of the stream obtained after the heat exchange of the lean absorbent is sent out of the boundary area as a light hydrocarbon component, and the remaining portion is returned and mixed into the absorbent. Wherein, the light hydrocarbon component is at least one selected from the group consisting of C3, C4 and C5 hydrocarbons.

According to the present invention, the enriched gas containing C2 components mainly comprises methane, C2 components, C3 components, C4 or heavier components (i.e. components having 4 or more carbon atoms) as well as water.

Preferably, based on the total volume of the enriched gas, the content of methane is 0-5 vol %, preferably 0-2 vol %; the content of C2 components is 40-85 vol %, preferably 45-65 vol %; the content of C3 components is 0-70 vol %, preferably 10-60 vol %; the content of C4 or heavier components is 0-20 vol %, preferably 0-10 vol %, and the water content is 0-0.5 vol %.

Compared with the conventional shallow cold oil absorption process, the method of the present invention can achieve a recovery rate of the C2 components of about 95% or more, and reduce the total energy consumption of the apparatus by about 10%-30%.

The method for recovering C2 components according to the present invention can be used to recover C2 components from a methane-containing industrial gas such as dry gas at a high recovery rate, but this does not necessarily indicate that in the obtained enriched gas, the content of C2 components must be higher than that of C3 components. In this method, the content of C3 components in the enriched gas is also related to the content of C3 components in the raw material.

The method according to the present invention may further comprise the recovery of C3 components, preferably the C3 components comprise propane and/or propylene.

The method according to the invention may comprise the recovery of C2 and C3 components, preferably the C2 and C3 components comprise ethane and/or ethylene, and propane and/or propylene.

The method according to the present invention may further comprise the recovery of C4 components, preferably the C4 components comprise butanes and/or butenes.

In a specific embodiment of the method of the present invention, a mixed liquid of the absorption rich liquid and the liquid phase obtained in step (1) or the absorption rich liquid is used as a first stream, the obtained first stream is depressurized and then subjected to a second gas liquid separation to obtain a second gas phase and a second liquid phase, and the second liquid phase is subjected to methane desorption to obtain a desorbed gas and a rich absorbent. Preferably, the method of the present invention can also recover C3 components, preferably the C3 components comprise propane and/or propylene. Preferably, the method of the present invention can recover the C2 and C3 components, preferably the C2 and C3 components comprise ethane and/or ethylene, and propane and/or propylene. Preferably, the methane-containing industrial gas comprises more than 0.1% mol of C6 or heavier components.

In a specific embodiment of the method of the present invention, the present invention provides a method for recovering C2 components in a methane-containing industrial gas, the method comprising the following steps:

(1) compressing the methane-containing industrial gas, and cooling the obtained compressed gas prior to performing gas-liquid separation, to obtain a gas phase and a liquid phase;

(2) contacting the gas phase with an absorbent to absorb the C2 components to obtain an absorption tail gas and an absorption rich liquid, and using a mixed liquid of the absorption rich liquid and the liquid phase obtained in step (1) or the absorption rich liquid as a first stream;

(3) depressurizing the first stream obtained in step (2);

(4) subjecting the stream after the depressurization of the first stream in step (3) to a second gas-liquid separation to obtain a second gas phase and a second liquid phase, returning the second gas phase to the compression in step (1), subjecting the second liquid phase to methane desorption to obtain a desorbed gas and a rich absorbent, and returning the desorbed gas to the compression in step (1) or discharging it externally;

(5) subjecting the rich absorbent to desorption separation to obtain a lean absorbent and an enriched gas comprising C2 components, for example, C2 and C3 components, the lean absorbent being returned and mixed into the absorbent in step (2).

Here, the gas-liquid separation in step (1) refers to a first gas-liquid separation. The "first gas-liquid separation" and "second gas-liquid separation" are only used to distinguish the sequence of the gas-liquid separation steps, and do not imply the importance of the gas-liquid separations. After the compressed gas is cooled, a first gas-liquid separation is performed to obtain a first gas phase and a first liquid phase.

In a specific embodiment of the method of the present invention, the present invention provides a method for recovering C2 and C3 components in a methane-containing industrial gas, the method comprising the following steps:

(1) compressing the raw material methane-containing industrial gas, and cooling the obtained compressed gas prior to performing a first gas-liquid separation, to obtain a first gas phase and a first liquid phase;

(2) contacting the first gas phase with an absorbent to absorb the C2 and C3 components to obtain an absorption tail gas and an absorption rich liquid, and using a mixed liquid of the absorption rich liquid and the first liquid phase or the absorption rich liquid as a first stream;

(3) depressurizing the first stream obtained in step (2);

(4) subjecting the depressurized first stream in step (3) to a second gas-liquid separation to obtain a second gas phase and a second liquid phase, returning the second gas phase to the compression in step (1), subjecting the second liquid phase to methane desorption to obtain a desorbed gas and a rich absorbent, and returning the desorbed gas to the compression in step (1) or discharging it externally;

(5) subjecting the rich absorbent to desorption separation to obtain a lean absorbent and an enriched gas comprising C2 and C3 components, the lean absorbent being returned and mixed into the absorbent in step (2).

Step (1) Compression and Cooling of a Methane-Containing Industrial Gas

According to the present invention, there is no particular limitation on the compression, and generally stage-by-stage compression is adopted to increase the pressure of the raw material methane-containing industrial gas to 2.5-5 MPaG, preferably 3-4.2 MPaG, that is, the pressure of the compressed gas is 2.5-5 MPaG, preferably 3-4.2 MPaG. Further preferably, the compression is a multi-stage compression, and in the present invention, there is no particular limitation on the stage number of the compression processing, for example, the compression can be a two-stage compression or a three-stage compression.

According to the present invention, the cooling is not particularly limited, preferably, temperature of the cooling is 5-45° C., preferably 10-20° C. In the present invention, a cooling medium having a temperature of 0° C. or higher is used to cool the compressed gas, and the cooling medium is at least one selected from the group consisting of low-temperature water, circulating water, propylene, ammonia and liquid nitrogen, preferably low-temperature water; further preferably, the low-temperature water is prepared by a lithium bromide absorption refrigerator and has a temperature of 5° C. or 7° C. Specifically, low-temperature water at 7° C. is used in the examples, but the present invention is not limited thereto.

According to the present invention, preferably, the cooled compressed gas is subjected to a first gas-liquid separation to obtain a first gas phase and a first liquid phase, wherein the first gas phase is mainly composed of light components such as hydrogen and C1-C3 hydrocarbons, and the first liquid phase is mainly composed of heavy components such as C3-C5 hydrocarbons.

Step (2) Contact of the First Gas Phase with an Absorbent to Absorb C2 Components According to the present invention, the absorbent is not particularly limited, and can be determined by a person skilled in the art according to common knowledge in the prior art. Preferably, the absorbent is selected from C4 fractions and/or C5 fractions, the C4 fractions comprise at least one of n-butane, isobutane and butene, the C5 fractions comprise at least one of n-pentane, isopentane and neopentane, C4 fraction is preferred. Specifically, butane is used as the absorbent in the examples, but the present invention is not limited thereto.

According to the present invention, preferably, absorption of C2 and C3 components is carried out in an absorption tower, more preferably, the theoretical plate number of the absorption tower is 15-30, the operation pressure of the absorption tower is 2.5-5 MPaG, preferably 3-4.2 MPaG, the tower top temperature of the absorption tower is 10-30° C., and the tower kettle temperature of the absorption tower is 10-60° C.

Preferably, the C2 and C3 components comprise ethane and/or ethylene, and propane and/or propylene.

According to the present invention, the first gas phase is absorbed under a high pressure, which is beneficial to absorption of C2 and C3 components and reduction of the amount of the absorbent used.

According to a specific embodiment of the present invention, the first gas phase is fed into the bottom of the absorption tower to be in countercurrent contact with the absorbent at the top of the absorption tower, thereby C2, C2 and C3 and heavier fractions in the first gas phase are absorbed. The absorption tail gas is discharged from the top of the absorption tower and sent out of the boundary area, and the absorption rich liquid is discharged from the tower kettle of the absorption tower and mixed with the first liquid phase to obtain the first stream or the absorption rich liquid is used as the first stream.

Step (3) Depressurizing the First Stream

Preferably, the pressure of the first stream after depressurization is 0.5-2.4 MPaG, preferably 0.8-2 MPaG.

In the present invention, the depressurization treatment is not particularly limited. Generally, the pressure of the first stream is reduced by the manner of flash evaporation, to thereby increase the relative volatility among the C1-C5 hydrocarbon components, so that the reboiler of the methane desorption tower bears a lower load, and the tower kettle temperature of the methane desorption tower is lowered, thus a heat source with lower-temperature level can be used, and steam consumption and energy consumption of the apparatus are saved.

According to a preferred embodiment of the present invention, prior to the depressurization treatment of the first stream, the first stream is subjected to cooling treatment to reduce the temperature of the first stream, to thereby reduce the gas phase volume of the second liquid separation tank and the compressor load.

According to a preferred embodiment of the present invention, after the first stream is depressurized, the first stream is subjected to cooling treatment to reduce the temperature of the first stream, to thereby reduce gas phase volume of the second liquid separation tank and the compressor load.

According to the present invention, specifically, the cooling treatment is not particularly limited, generally a cooler is used for cooling, and preferably, the temperature of the first stream is 5-40° C., preferably 5-15° C.

Step (4) Subjecting the Depressurized First Stream to a Second Gas-Liquid Separation and Subjecting the Second Liquid Phase to Methane Desorption According to a preferred embodiment of the present invention, the first stream after the cooling treatment and depressurization treatment is fed into a second liquid separation tank for a second gas-liquid separation to obtain a second gas phase and a second liquid phase, the second gas phase is returned to an inlet or interstage of the compressor, and the second liquid phase is subjected to methane desorption; wherein, the second gas phase is mainly composed of light components having C2 or lighter components, and the second liquid phase is mainly composed of heavy components having C2 or heavier components.

In the present invention, the second liquid phase is subjected to methane desorption in a methane desorption tower, the obtained desorbed gas is returned to the inlet/interstage of the compressor or discharged externally, and the rich absorbent is subjected to absorbent desorption separation, wherein the desorbed gas is mainly composed of light components such as methane, and the rich absorbent is mainly composed of the absorbent comprising C2 and C3 components.

In the present invention, the second gas phase and the desorbed gas are returned to the inlet or interstage of the compressor, and return position can be determined according to the pressure of the raw material methane-containing industrial gas, the inter-stage pressure of the compressor and the pressure of the methane desorption tower. While ensuring that the desorbed gas discharged from the top of the methane desorption tower can be pressurized by the compressor, the energy consumption of the compressor shall be saved as much as possible.

According to the present invention, preferably, methane desorption is performed in a methane desorption tower; more preferably, the theoretical plate number of the methane desorption tower is 20-50, the operation pressure of the methane desorption tower is 0.5-2.4 MPaG, the tower top temperature of the methane desorption tower is 10-40° C., and the tower kettle temperature of the methane desorption tower is 35-100° C.

In a preferred embodiment, the operation pressure of the methane desorption tower is 1.0-1.9 MPaG.

In a preferred embodiment, the tower top temperature of the methane desorption tower is 10-20° C.

In a preferred embodiment, the tower kettle temperature of the methane desorption tower is 40-75° C.

Preferably, the methane desorption tower is operated at a low pressure to distill out the methane in the second liquid phase at a small cost, thereby reducing the methane content in the enriched gas. The rich absorbent discharged from the tower kettle of the methane desorption tower is subjected to absorbent desorption treatment to obtain a lean absorbent.

Preferably, the heat source of the tower kettle of the methane desorption tower is provided by the reboiler of the methane desorption tower, and the heat source of the reboiler of the methane desorption tower is the process stream. Specifically, the process stream is at least one selected from the group consisting of the absorbent, the rich absorbent and the lean absorbent, preferably the lean absorbent.

Step (5) Subjecting the Rich Absorbent to Desorption Separation

According to the present invention, preferably, the desorption separation is carried out in a desorption tower, more preferably, the theoretical plate number of the desorption tower is 20-50, the operation pressure of the desorption tower is 1-2.8 MPaG, the tower top temperature of the desorption tower is 15-70° C., and the tower kettle temperature of the desorption tower is 90-200° C.

According to a specific embodiment of the present invention, the rich absorbent is desorbed and separated in a desorption tower, an enriched gas mainly composed of C2 and C3 components is recovered from the top of the desorption tower, a lean absorbent is discharged from the tower kettle of the desorption tower to provide heat for the tower kettle of the methane desorption tower, and at least a portion of the second stream obtained after heat exchange of the lean absorbent is returned and mixed into the absorbent.

Preferably, a portion of the second stream obtained after heat exchange of the lean absorbent is sent out of the boundary area as a light hydrocarbon component, and the remaining portion is returned and mixed into the absorbent. Wherein, the light hydrocarbon component is at least one selected from the group consisting of C4 and C5 hydrocarbons.

According to the method of the present invention, the enriched gas containing C2 and C3 components mainly comprises methane, C2 components, C3 components, C4 or heavier components as well as water.

Preferably, based on the total volume of the enriched gas, the content of methane is 0-5 vol %, preferably 0-2 vol %; the content of C2 components is 30-70 vol %, preferably 40-60 vol %; the content of C3 components is 20-70 vol %, preferably 30-60 vol %; the content of C4 or heavier components is 0-20 vol %, preferably 0-10 vol %, and the water content is 0-0.5 vol %.

Compared with the conventional shallow cold oil absorption process, the method of the present invention can achieve a recovery rate of the C2 components or C2 and C3 components of about 95% or more, and reduce the total energy consumption of the apparatus by about 10%-30%.

The method according to the present invention may further comprise the recovery of the C4 components, which comprise butanes and/or butenes.

According to the present invention, two gas-liquid separation steps are suitable for the recovery of heavier methane-containing industrial gas such as dry gas. It will be appreciated that, on the basis of the method for the recovery of C2 components or C2 and C3 components according to the present invention, by adding the gas-liquid separation step, it will be suitable for the treatment of heavier methane-containing industrial gas, to thereby further recover C4 components, as needed. It will be appreciated that, depending on the amount of heavy components in the methane-containing industrial gas, gas-liquid separation steps can be increased or decreased, and combined with the absorption step and methane desorption step, to recover C2-C4 components, as needed.

In a second aspect, the present invention provides a apparatus for recovering C2 components in a methane-containing industrial gas, the apparatus comprising: a compressor, a cooler, a liquid separation tank, an absorption tower, a methane desorption tower and a desorption tower; the compressor is connected to a pipeline of a methane-containing industrial gas such as dry gas, and the compressor, the cooler and the liquid separation tank are connected in sequence;

the absorption tower has its bottom respectively connected to the top of the liquid separation tank and the cooler, for contacting the gas phase discharged from the top of the liquid separation tank with an absorbent in countercurrent, an absorption tail gas is discharged from the top of the absorption tower, and an absorption rich liquid is discharged from the tower kettle of the absorption tower and returned to the cooler;

the methane desorption tower has its upper part, top and bottom respectively connected to the bottom of the liquid separation tank, the compressor and a middle part of the desorption tower, for methane desorption of the liquid phase discharged from the bottom of the liquid separation tank after depressurization, a desorbed gas is discharged from the top of the methane desorption tower and returned to an inlet or interstage of the compressor or discharged externally, and a rich absorbent is discharged from the tower kettle of the methane desorption tower and then passed into the middle part of the desorption tower for desorption separation;

the desorption tower has its bottom connected to the top of the absorption tower, a lean absorbent is discharged from the tower kettle of the desorption tower and is returned to the top of the absorption tower, and an enriched gas comprising C2 components, such as C2 and C3 components, is recovered from the top of the desorption tower.

According to the present invention, preferably, the apparatus further comprises a methane desorption tower reboiler; the methane desorption tower reboiler is respectively connected to the bottom of the desorption tower, the lower part and the bottom of the methane desorption tower and the top of the absorption tower, for providing heat for the tower kettle of the methane desorption tower with the lean absorbent discharged from the tower kettle of the desorption tower, and at least a portion of the stream obtained after heat exchange of the lean absorbent is returned to the top of the absorption tower.

Preferably, the methane desorption tower reboiler is also connected to a post-treatment unit, which is used to send a portion of the stream obtained after heat exchange of the lean absorbent discharged from the methane desorption tower reboiler out of the boundary area as a light hydrocarbon component for post-treatment, and the remaining portion is returned to the top of the absorption tower.

Preferably, the light hydrocarbon component is at least one selected from the group consisting of C3, C4 and C5 hydrocarbons.

Preferably, the upper part of the methane desorption tower is $1/20$-$1/5$ of the methane desorption tower.

Preferably, the lower part of the methane desorption tower is $4/5$-$5/6$ of the methane desorption tower.

Preferably, the middle part of the desorption tower is $1/6$-$2/3$ of the desorption tower.

The apparatus according to the present invention can also recover C3 components, preferably, the C3 components comprise propane and/or propylene.

The apparatus according to the present invention can also recover C4 components, preferably, the C4 components comprise butane and/or butene.

In a third aspect, the present invention provides a apparatus for recovering C2 components in a methane-containing industrial gas, the apparatus comprising: a compressor, a cooler, a first liquid separation tank, an absorption tower, a second liquid separation tank, a methane desorption tower and a desorption tower;

the compressor is connected to a pipeline of a methane-containing industrial gas such as dry gas, and the compressor, the cooler and the first liquid separation tank are connected in sequence;

the absorption tower has its bottom respectively connected to the top of the first liquid separation tank and an middle part of the second liquid separation tank, for contacting the first gas phase discharged from the top of the first liquid separation tank with an absorbent in countercurrent, an absorption tail gas and an absorption rich liquid are respectively discharged from the top and tower kettle of the absorption tower, a mixed liquid of the absorption rich liquid and a first liquid phase discharged from the bottom of the first liquid separation tank or the absorption rich liquid is used as a first stream, and the first stream is depressurized and then passed into the middle part of the second liquid separation tank for a second gas-liquid separation;

the second liquid separation tank has its top and bottom respectively connected to the compressor and the upper part of the methane desorption tower, a second gas phase is discharged from the top of the second liquid separation tank and returned to an inlet or interstage of the compressor, and a second liquid phase is discharged from the bottom of the second liquid separation tank and passed into the upper part of the methane desorption tower for methane desorption;

the methane desorption tower has its top and bottom respectively connected to the compressor and a middle part of the desorption tower, a desorbed gas is discharged from the top of the methane desorption tower and returned to the inlet or interstage of the compressor or discharged externally, and a rich absorbent is discharged from the tower kettle of the methane desorption tower and passed into the middle part of the desorption tower for desorption separation;

the desorption tower has its bottom connected to the top of the absorption tower, a lean absorbent is discharged from the tower kettle of the desorption tower and is returned to the top of the absorption tower, and an enriched gas comprising C2 components, such as C2 and C3 components, is recovered from the top of the desorption tower.

According to the present invention, preferably, the apparatus further comprises a methane desorption tower reboiler; the methane desorption tower reboiler is respectively connected to the bottom of the desorption tower, the lower part and the bottom of the methane desorption tower and the top of the absorption tower, for providing heat for the tower kettle of the methane desorption tower with the lean absorbent discharged from the tower kettle of the desorption tower, and at least a portion of the (second) stream obtained after heat exchange of the lean absorbent is returned to the top of the absorption tower.

Preferably, the methane desorption tower reboiler is also connected to a post-treatment unit, which is used to send a portion of the (second) stream obtained after heat exchange of the lean absorbent discharged from the methane desorption tower reboiler out of the boundary area as a light hydrocarbon component for post-treatment, and the remaining portion is returned to the top of the absorption tower.

Preferably, the light hydrocarbon component is at least one selected from the group consisting of C4 and C5 hydrocarbons.

Preferably, the middle part of the second liquid separation tank is $1/3$-$2/3$ of the second liquid separation tank.

Preferably, the upper part of the methane desorption tower is $1/20$-$1/5$ of the methane desorption tower.

Preferably, the lower part of the methane desorption tower is $4/5$-$5/6$ of the methane desorption tower.

Preferably, the middle part of the desorption tower is 1/6-2/3 of the desorption tower.

The apparatus according to the present invention can also recover C3 components, preferably, the C3 components comprise propane and/or propylene.

The apparatus according to the present invention can also recover C4 components, preferably, the C4 components comprise butane and/or butene.

The apparatus for recovering C2 components in a methane-containing industrial gas such as dry gas provided by the present invention will be described in detail by referring to FIG. 1. The apparatus comprises a compressor 2, a cooler 3, a liquid separation tank 4, an absorption tower 5, a methane desorption tower 7 and a desorption tower 9. The compressor 2, the cooler 3 and the liquid separation tank 4 are connected in sequence; the compressor 2 is connected to a pipeline of a methane-containing industrial gas such as refinery dry gas 1; the absorption tower 5 has its bottom respectively connected to the top of the liquid separation tank 4 and the cooler 3, for contacting the gas phase produced by the liquid separation tank with an absorbent in countercurrent, an absorption tail gas 14 is discharged from the top of the absorption tower 5, and an absorption rich liquid is discharged from the tower kettle of the absorption tower 5, pressurized by the absorption tower kettle liquid pump 6 and then returned to the cooler 3; the methane desorption tower 7 has its upper part, top and bottom respectively connected to the bottom of the liquid separation tank 4, the compressor 2 and the desorption tower 9, for the methane desorption of the liquid phase produced by the liquid separation tank 4 after depressurization, a desorbed gas is discharged from the top of the methane desorption tower 7 and returned to the compressor 2, and a rich absorbent is discharged from the tower kettle of the methane desorption tower 7, pressurized by the rich absorbent pump 8 and then passed into the middle part of the desorption tower 9 for desorption separation; the desorption tower 9 has its bottom connected to the top of the absorption tower 5, a lean absorbent is discharged from the tower kettle of the desorption tower and is returned to the top of the absorption tower 5, and an enriched gas 10 comprising C2 components is recovered from the top of the desorption tower 9.

According to a preferred embodiment of the present invention, the apparatus further comprises a methane desorption tower reboiler 15; the methane desorption tower reboiler 15 is respectively connected to the bottom of the desorption tower 9, the lower part and the bottom of the methane desorption tower 7 and the top of the absorption tower 5, for providing heat for the tower kettle of the methane desorption tower 7 with the lean absorbent discharged from the tower kettle of the desorption tower 9, a portion of the stream 13 obtained after heat exchange of the lean absorbent is sent out of the boundary area as a light hydrocarbon component 12 for post-treatment, and the remaining portion is returned to the top of the absorption tower 5.

Figure 2:
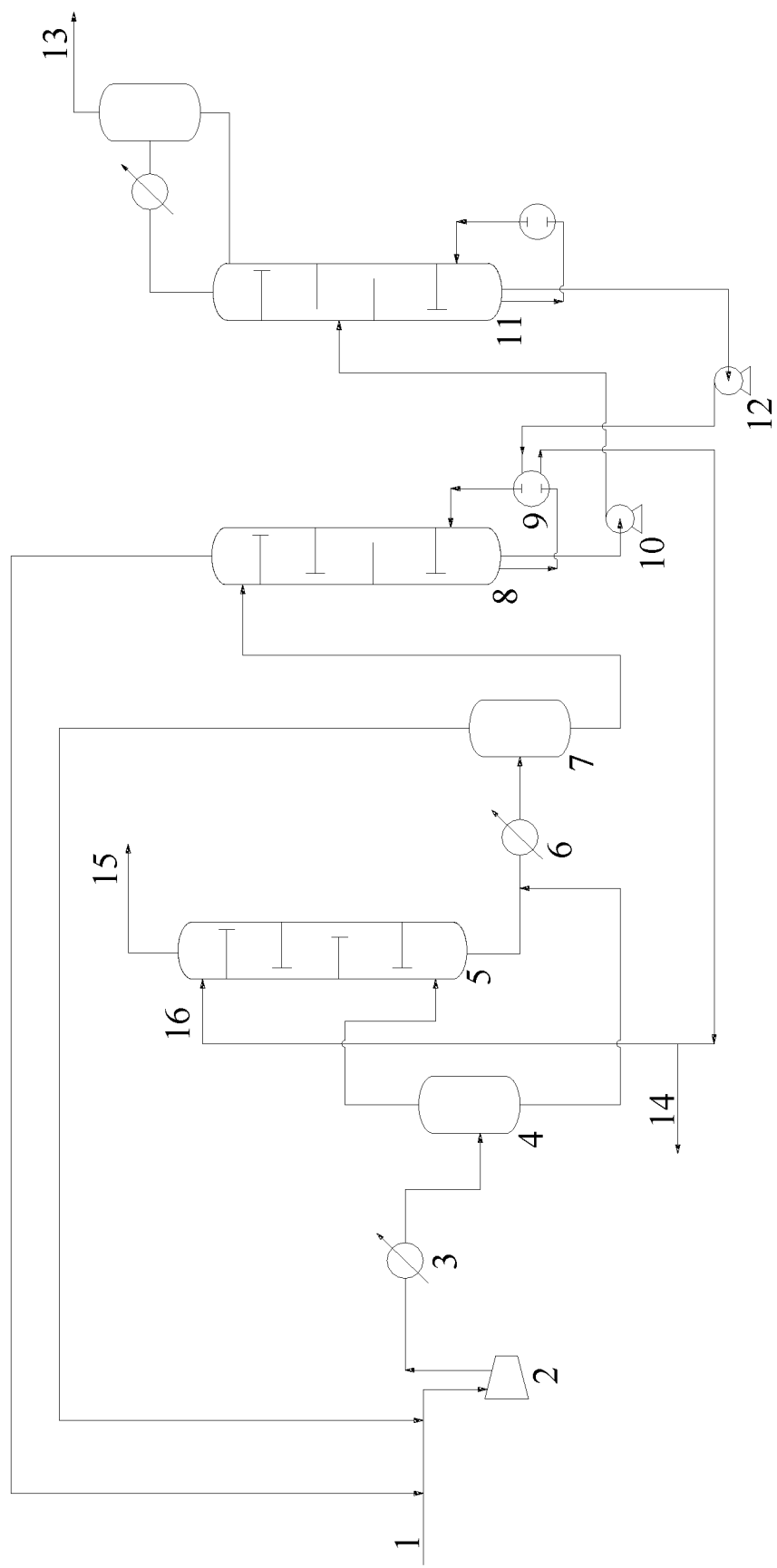
FIG. 2 is a schematic diagram of the apparatus for recovering C2 components in a methane-containing industrial gas such as dry gas as provided by the present invention, wherein: description of reference signs: 1. Raw material methane-containing industrial gas such as dry gas; 2. Compressor; 3. Cooler; 4. First liquid separation tank; 5. Absorption tower; 6. Desorption tower feed cooler; 7. Second liquid separation tank; 8. Methane desorption tower; 9. Methane desorption tower reboiler; 10. Rich absorbent pump; 11. Desorption tower; 12. Absorbent circulating pump; 13. Enriched gas containing C2 components; 14. Light hydrocarbon components; 15. Absorption tail gas; 16 Second stream.

The apparatus for recovering C2 components in a methane-containing industrial gas such as dry gas provided by the present invention will be described in detail by referring to FIG. 2. The apparatus comprises: a compressor 2, a cooler 3, a first liquid separation tank 4, an absorption tower 5, a second liquid separation tank 7, a methane desorption tower 8 and a desorption tower 11; the compressor 2, the cooler 3 and the first liquid separation tank 4 are connected in sequence, the compressor 2 is connected to a methane-containing industrial gas such as refinery dry gas 1; the absorption tower 5 has its bottom respectively connected to the top of the first liquid separation tank 4 and the middle part of the second liquid separation tank 7, for contacting the first gas phase discharged from the top of the first liquid separation tank 4 with an absorbent in countercurrent, an absorption tail gas 15 is discharged from the top of the absorption tower 5, and an absorption rich liquid is discharged from the tower kettle of the absorption tower 5 and mixed with the first liquid phase discharged from the bottom of the first liquid separation tank 4 to obtain a first stream; the second liquid separation tank 7 has its top and bottom respectively connected to the compressor 2 and the upper part of the methane desorption tower 8, for a second gas-liquid separation of the depressurized first stream after cooling by the desorption tower feed cooler 6, a second gas phase is discharged from the top of the second liquid separation tank 7 and returned to the compressor 2, a second liquid phase is discharged from the bottom of the second liquid separation tank 7 and passed into the upper part of the methane desorption tower 8; the methane desorption tower 8 has its top and bottom respectively connected to the compressor 2 and the middle part of the desorption tower 11, for methane desorption of the second liquid phase discharged from the bottom of the second liquid separation tank 7, a desorbed gas is discharged from the top of the methane desorption tower 8 and returned to the compressor 2, a rich absorbent is discharged from the tower kettle of the methane desorption tower 8, pressurized by a rich absorbent pump 10, and passed into the middle part of the desorption tower 11; the desorption tower 11 has its bottom connected to the top of the absorption tower 5, for desorption separation of the rich absorbent discharged from the tower kettle of the methane desorption tower 8, an enriched gas 13 comprising C2 components is recovered from the top of the desorption tower 11, and a lean absorbent is discharged from the tower kettle of the desorption tower 11 and returned to the top of the absorption tower 5.

According to a preferred embodiment of the present invention, the apparatus further comprises a methane desorption tower reboiler 9, the methane desorption tower reboiler 9 is respectively connected to the lower part and the bottom of the methane desorption tower 8 and the top of the absorption tower 5, for providing heat for the tower kettle of the methane desorption tower 8 with the lean absorbent discharged from the tower kettle of the desorption tower 11, a portion of the second stream 16 obtained after heat exchange of the lean absorbent is sent out of the boundary area as a light hydrocarbon component 14 for post-treatment, and the remaining portion is returned to the top of the absorption tower 5.

Compared with the prior art, the advantages and beneficial effects of the method and apparatus for recovering C2-C4 components (including but not limited to C2 components or C2 and C3 components or C2, C3 and C4 components) in a methane-containing industrial gas provided by the present invention include, but are not limited to:

(1) By adopting C2-C4 component absorption at a high pressure, methane desorption at a low pressure and desorption separation, the present invention not only reduces the amount of absorbent and reduces energy consumption of absorbent desorption, but also reduces the load of the methane desorption tower reboiler and the tower kettle temperature of the methane desorption tower due to increase in the relative volatility among the C1-05 hydrocarbon components under a low pressure, so that the methane desorption tower reboiler only needs the process stream (the lean absorbent from the desorption tower kettle) in the apparatus as heat source, which greatly saves consumption of steam and energy consumption of the apparatus.

(2) The C4 fraction and/or C5 fraction absorption process and the methane desorption process are performed independently in two towers, with little mutual influence and no back-mixing. The absorption process and the methane desorption process are each operated under ideal conditions, that is, high pressure and low temperature are favorable for absorption, the absorbent is used in a small amount, and processing amount of the distillation tower is small; low pressure is favorable for distillation of methane.

(3) Since the load of the methane desorption tower reboiler decreases with the decrease of the operation pressure, as to returning the top desorbed gas of the methane desorption tower to the inlet or interstage of the compressor, the pressure of the methane desorption tower can be controlled, so that the methane desorption tower reboiler just uses up the waste heat of the lean absorbent of the desorption tower kettle, and at the same time, the energy consumption of the compressor is increased by the minimum, thereby the total energy consumption of the apparatus is minimized.

(4) The process stream in the apparatus is used as the heat source of the methane desorption tower reboiler. If the feed to the methane desorption tower fluctuates, change in the load of its reboiler has little effect on the total energy consumption of the apparatus, which increases the operation flexibility of the apparatus.

(5) The C2-C4 components in the methane-containing industrial gas are absorbed in the absorption tower by using C4 fraction and/or the C5 fraction as the absorbent, the absorbent raw material is easy to obtain, and low in cost.

(6) The process flow has a lowest temperature of 5-15° C. for the compression and cooling, absorption and rectification operations, needs no propylene refrigeration compressor, can use a lithium bromide refrigeration unit to provide cooling capacity, requires no drying apparatus, and is low in investment, simple in operation and low in energy consumption.

(5) The recovery rate of C2-C4 components can reach 95% or more, and the obtained enriched gas containing C2 components, enriched gas containing C2 and C3 components, or enriched gas containing C2, C3 and C4 components, for example, can be used as the raw material for an ethane cracking furnace or gas separation unit.

(6) The absorption rich liquid of the absorption tower is fully contacted with the compressed gas in the liquid separation tank and absorbs a part of C2-C4 and other heavy components therein in advance, thereby reducing the amount of gas phase entering the absorption tower, reducing the amount of absorbent in the absorption tower, and saving energy consumption.

(7) Before subjecting the first stream obtained after mixing the first liquid phase and the absorption rich liquid to methane desorption, a second liquid separation tank is arranged to separate the gas phase flashed out of the first stream in the depressurization process beforehand, so as to prevent the whole gas phase separation process from proceeding in the methane desorption tower, thereby saving 50% of the gas phase space required by the methane desorption tower and saving equipment investment.

EXAMPLES

In order to facilitate understanding of the present invention, the present invention will be described in detail below through specific examples.

Example 1 and Comparative Example 1

In Example 1 and Comparative Example 1, a refinery dry gas was used as the raw material, and was treated by the method of the present invention and the typical shallow cold oil absorption process, respectively, to recover C2 components. The composition and process parameters of the dry gas from a refinery were shown in Table 1.

TABLE 1

| Composition and process parameters of the refinery dry gas | |
|---|---|
| | Refinery dry gas |
| Temperature, ° C. | 40.0 |
| Pressure, MPaG | 1.20 |
| Mass flow, t/h | 54.0 |
| | Composition, mol % |
| $H_2$ | 45.03 |
| $N_2$ | 5.47 |
| $CH_4$ | 12.11 |
| | Refinery dry gas |
| $C_2H_6$ | 12.76 |
| $C_3H_8$ | 12.10 |
| $C_4H_{10}$ | 10.32 |
| C5+ | 2.02 |
| $H_2O$ | 0.18 |

Example 1

Example 1 was used to illustrate the method and apparatus for oil absorption and separation of the dry gas to recover C2 components of the present invention.

The apparatus comprised a compressor 2, a cooler 3, a liquid separation tank 4, an absorption tower 5, a methane desorption tower 7, a desorption tower 9 and a methane desorption tower reboiler 15; the compressor 2, the cooler 3 and the liquid separation tank 4 were connected in sequence; the compressor 2 was connected to a pipeline of the refinery dry gas 1;

the absorption tower 5 had its bottom respectively connected to the top of the liquid separation tank 4 and the cooler 3, and was used for contacting the gas phase produced by the liquid separation tank with an absorbent in countercurrent, an absorption tail gas 14 was discharged from the top of the absorption tower 5, and an absorption rich liquid was discharged from the tower kettle of the absorption tower 5, pressurized by the absorption tower kettle liquid pump 6 and then returned to the cooler 3;

the methane desorption tower 7 had its upper part, top and bottom respectively connected to the bottom of the liquid separation tank 4, the compressor 2 and the desorption tower 9, and was used for methane desorption of the liquid phase produced by the liquid separation tank 4 after depressurization, a desorbed gas was discharged from the top of the methane desorption tower 7 and returned to the compressor 2, and a rich absorbent was discharged from the tower kettle of the methane desorption tower 7, pressurized by a rich absorbent pump 8 and then entered into the middle part of the desorption tower 9;

the desorption tower 9 had its bottom connected to the methane desorption tower reboiler 15, and was used for desorption separation of the rich absorbent discharged from the tower kettle of the methane desorption tower 7, an enriched gas 10 comprising C2 components was recovered from the top of the desorption tower 9, a lean absorbent was discharged from the tower kettle of the desorption tower 9 and served as the heat source of the methane desorption tower reboiler 15; the methane desorption tower reboiler 15 was respectively connected to the lower part and the bottom of the methane desorption tower 7 and the top of the absorption tower 5, and was used for providing heat for the tower kettle of the methane desorption tower 7 with the lean absorbent discharged from the tower kettle of the desorption tower 9, a portion of the stream 13 obtained after heat exchange of the lean absorbent was sent out of the boundary area as a light hydrocarbon component 12 for post-treatment, and the remaining portion was returned to the top of the absorption tower 5.

The method comprised the following steps:

(1) The refinery dry gas with a pressure of 1.2 MPaG entered into the compressor. After three-stage compression treatment, the compressed dry gas had a pressure of 3.9 MPaG. After being combined with the absorption rich liquid (118 t/h) of the absorption tower, the pressurized dry gas was cooled to 15° C. with a refrigerant water of 7° C. prepared by a lithium bromide absorption refrigerator via the cooler, and sent to the liquid separation tank for gas-liquid phase separation. The gas phase at the top of the liquid separation tank was sent to the bottom of the absorption tower, and the liquid phase at the bottom of the liquid separation tank was depressurized to 1.5 MPaG and then sent to the methane desorption tower for treatment.

(2) In the absorption tower, a refinery mixed butane was used as the absorbent (the circulation amount of the absorbent was 105 t/h), and injected from the top of the tower to absorb the C2 fractions and heavier components in the feed gas. The absorption tower had a theoretical plate number of 20, an operation pressure of 3.8 MPaG, a tower top temperature of 17° C., and a tower kettle temperature of 22° C. The liquid phase of the absorption tower kettle was pressurized to 4 MPaG by the absorption tower kettle liquid pump, and before being returned to the cooler, was combined with the gas phase from the compressor outlet. The unabsorbed tail gas at the top of the absorption tower was sent out of the boundary area and sent to the absorbent recovery unit outside the boundary area.

(3) The liquid phase at the bottom of the liquid separation tank was depressurized to 1.8 MPaG, and entered into the top of the methane desorption tower under the action of pressure difference to remove the light components such as methane in the tower feed. The methane desorption tower had a theoretical plate number of 30, an operation pressure of 1.5 MPaG, a tower top temperature of 13° C., and a tower kettle temperature of 67° C. The gas phase at the top of the methane desorption tower was returned to the inlet of the compressor, and the material discharged from the tower kettle of the methane desorption tower was pressurized to 2.5 MPaG by the rich absorbent pump and sent to the middle part of the desorption tower.

(4) The desorption tower had a theoretical plate number of 40, an operation pressure of 2.0 MPaG, a tower top temperature of 56° C., and a tower kettle temperature of 109° C. The desorption tower was heated by low-pressure steam, the enriched gas containing C2 components was obtained at the top of the tower and sent to an ethane cracking furnace as raw material, the lean absorbent (having a temperature of 109° and pressurized to 4.4 MPaG C by an absorbent circulating pump) of the desorption tower kettle provided heat for the methane desorption tower reboiler, the stream obtained after heat exchange was returned to the absorption tower for recycling, and at the same time, a stream of light hydrocarbon product mainly composed of C3-C5 hydrocarbons was withdrawn to be sent out of the boundary area and sent to the cracking furnace of an ethylene apparatus as raw material.

The method of this example obtained the enriched gas containing C2 components and the light hydrocarbon component, and their compositions and process parameters were shown in Table 2, wherein C2 recovery rate was 98.3%.

TABLE 2

Enriched gas and light hydrocarbon component

|  | Enriched gas | Light hydrocarbon component |
| --- | --- | --- |
| Temperature, ° C. | 40 | 40 |
| Pressure, MPaG | 1.97 | 3.96 |
| Mass flow, t/h | 21.21 | 17.9 |

| Composition, mol % | | |
| --- | --- | --- |
| $CH_4$ | 1.1 | 0 |
| $C_2H_6$ | 56.05 | 0.02 |
| $C_3H_8$ | 35.32 | 17.74 |
| $C_4H_{10}$ | 7.46 | 67.43 |
| C5+ | 0 | 14.81 |
| $H_2O$ | 0.07 | 0 |

Comparative Example 1

The refinery dry gas in Table 1 was recovered by using the typical shallow cold oil absorption process in CN109553504A. The process adopted in Comparative Example 1 differed from Example 1 mainly in that C4 absorbent absorption and methane desorption processes were carried out in one absorption-steaming tower, and were close in the operation pressure. Since the methane desorption process involved a relatively high pressure, the tower kettle temperature was relatively high, and low-pressure steam was used as the heat source of the tower kettle reboiler in the methane desorption process.

The method of this Comparative Example 1 obtained an enriched gas containing C2 components, whose composition was shown in Table 3, wherein the C2 recovery rate was 98.3%. Comparison data between the present invention and the technical solutions of the typical shallow cold oil absorption process and cryogenic separation process in the prior art were shown in Table 4.

TABLE 3

Composition of the Enriched gas

| Composition of the Enriched gas, mol % | |
|---|---|
| $CH_4$ | 4.22 |
| $C_2H_6$ | 48.32 |
| $C_3H_8$ | 40.25 |
| $C_4H_{10}$ | 7.12 |
| $H_2O$ | 0.09 |

TABLE 4

Comparison data between the present invention and the prior art

| | Present invention | Typical shallow cold oil absorption process | Cryogenic separation process |
|---|---|---|---|
| Minimum temperature of process stream/° C. | 5-15 | 5-15 | −100 |
| Drying apparatus | No | No | Yes |
| Absorption tower pressure/MPaG | 3.8 | 3.8 | — |
| Methane desorption tower pressure/MPaG | 1.5 | 3.8 | — |
| Tower kettle temperature of methane desorption tower/° C. | 70 | 125 | — |
| Heating medium for tower kettle of methane desorption tower | Lean absorbent of desorption tower kettle | Low-pressure steam | — |
| Load of methane desorption tower reboiler/kW | 4617 | 13121 | — |
| Total energy consumption of apparatus/kg standard oil/t raw material | 37.5 | 45.6 | — |
| Reduction of total energy consumption of apparatus/% | 17.8 | — | — |

As can be seen from Tables 2-4, the lowest temperature of the process stream of the present invention was 5-15° C., neither a low-temperature level propylene cooling capacity nor a propylene refrigeration apparatus and a drying apparatus were required, and thus the equipment investment was low. Compared with the conventional shallow cold oil absorption process, under the condition of obtaining the same high C2 recovery rate, by reducing the pressure of the methane desorption process, the present invention greatly reduced the energy consumption required for the process and at the same time reduced the grade of the heating medium, and could use the hot process stream in the apparatus to provide all the heat of the methane desorption tower, which saved the consumption of low-pressure steam introduced from outside the apparatus, and reduced the total energy consumption of the apparatus by 17.8%.

Example 2 and Comparative Example 2

In Example 2 and Comparative Example 2, a refinery dry gas was used as the raw material, and was treated by the method of the present invention and the typical shallow cold oil absorption process, respectively, to recover C2 and C3 components. The composition and process parameters of the dry gas from a refinery were shown in Table 5.

TABLE 5

Composition and process parameters of the refinery dry gas

| | Refinery dry gas |
|---|---|
| Temperature, ° C. | 40.0 |
| Pressure, MPaG | 1.0 |
| Mass flow, t/h | 54.0 |

| Composition, mol % | |
|---|---|
| $H_2$ | 45.03 |
| $N_2$ | 5.47 |
| $CH_4$ | 12.11 |
| $C_2H_6$ | 12.76 |
| $C_3H_8$ | 12.10 |
| $C_4H_{10}$ | 10.32 |
| C5+ | 2.02 |
| $H_2O$ | 0.18 |

Example 2

Example 2 was used to illustrate the method and apparatus for oil absorption and separation of the dry gas to recover C2 and C3 components of the present invention.

The apparatus comprised: a compressor 2, a cooler 3, a first liquid separation tank 4, an absorption tower 5, a second liquid separation tank 7, a methane desorption tower 8, a methane desorption tower reboiler 9 and a desorption tower 11;

the compressor 2, the cooler 3 and the first liquid separation tank 4 were connected in sequence, the compressor 2 was connected to a refinery dry gas 1;

the absorption tower 5 had its bottom respectively connected to the top of the first liquid separation tank 4 and the middle part of the second liquid separation tank 7, and was used for contacting the first gas phase discharged from the top of the first liquid separation tank 4 with an absorbent in countercurrent, an absorption tail gas 15 was discharged from the top of the absorption tower 5, and an absorption rich liquid was discharged from the tower kettle of the absorption tower 5 and mixed with the first liquid phase discharged from the bottom of the first liquid separation tank 4 to obtain a first stream;

the second liquid separation tank 7 had its top and bottom respectively connected to the compressor 2 and the upper part of the methane desorption tower 8, and was used for a second gas-liquid separation of the depressurized first stream after cooling by the desorption tower feed cooler 6, a second gas phase was discharged from the top of the second liquid separation tank 7 and returned to the compressor 2, a second liquid phase was discharged from the bottom of the second liquid separation tank 7 and entered into the upper part of the methane desorption tower 8;

the methane desorption tower 8 had its top and bottom respectively connected to the compressor 2 and the middle part of the desorption tower 11, and was used for the methane desorption of the second liquid phase discharged from the bottom of the second liquid separation tank 7, a desorbed gas was discharged from the top of the methane desorption tower 8 and returned to the compressor 2, a rich absorbent was discharged from the tower kettle of the methane desorption tower 8, pressurized by a rich absorbent pump 10, and entered into the middle part of the desorption tower 11; the desorption tower 11 had its bottom connected to the methane desorption tower reboiler 9, and was used for desorption separation of the rich absorbent discharged from the tower kettle of the methane desorption tower 8, an enriched gas 13 mainly composed of C2 and C3 components was recovered from the top of the desorption tower 11, and a lean absorbent was discharged from the tower kettle of the desorption tower, pressurized by an absorbent circulating pump 12 and was used as the heat source of the methane desorption tower reboiler 9;

the methane desorption tower reboiler 9 was respectively connected to the lower part and the bottom of the methane desorption tower 8 and the top of the absorption tower 5, and was used for providing heat for the tower kettle of the methane desorption tower 8 with the lean absorbent discharged from the tower kettle of the desorption tower 11, a portion of the second stream 16 obtained after heat exchange was sent out of the boundary area as a light hydrocarbon component 14 for post-treatment, and the remaining portion was returned to the top of the absorption tower 5.

The method comprised the following steps:

(1) The refinery dry gas with a pressure of 1 MPaG entered into the compressor. After two-stage compression treatment, the compressed dry gas had a pressure of 3.7 MPaG. The pressurized dry gas was cooled to 15° C. with a refrigerant water of 7° C. prepared by a lithium bromide absorption refrigerator via the cooler, and sent to the first liquid separation tank for a first gas-liquid phase separation. The first gas phase discharged from the top of the first liquid separation tank entered into the bottom of the absorption tower, and the first liquid phase discharged from the bottom of the first liquid separation tank was depressurized to 1.7 MPaG and then sent to the methane desorption tower for treatment.

(2) In the absorption tower, a refinery n-butane was used as the absorbent (the circulation amount of the absorbent was 120 t/h), and injected from the top of the tower to absorb the C2 and C3 fractions and heavier components in the dry gas. The absorption tower had a theoretical plate number of 20, an operation pressure of 3.6 MPaG, a tower top temperature of 17° C., and a tower kettle temperature of 27° C. The unabsorbed tail gas at the top of the absorption tower was sent to a fuel gas pipe network, and the absorption rich liquid at the tower kettle of the absorption tower was depressurized to 1.7 MPaG, and then mixed with the first liquid phase to obtain the first stream.

(3) The first stream was cooled to 15° C. in the desorption tower feed cooler, and then sent to the second liquid separation tank for a second gas-liquid separation. The second gas phase was mainly composed of light components of C2 and lower, and returned to the inlet of the dry gas compressor.

(4) The second liquid phase entered into the top of the methane desorption tower to remove light components such as methane in the second liquid phase, and the desorbed gas at the top of the methane desorption tower was returned to the inlet of the dry gas compressor. The methane absorption tower had a theoretical plate number of 30, an operation pressure of 1.5 MPaG, a tower top temperature of 15° C., and a tower kettle temperature of 55° C. The methane desorption tower reboiler selected the lean absorbent (having a temperature of 105° C., and pressurized by the absorbent circulating pump) from the desorption tower kettle as the heat source of the methane desorption tower reboiler.

(5) The rich absorbent discharged from the tower kettle of the methane desorption tower was pressurized by the rich absorbent pump and sent to the middle part of the desorption tower. The desorption tower had a theoretical plate number of 40, an operation pressure of 1.6 MPaG, a tower top temperature of 55° C., and a tower kettle temperature of 105° C. The desorption tower was heated by low-pressure steam, an enriched gas mainly composed of C2 and C3 components was obtained at the top of the tower and sent to the cracking furnace of an ethylene unit as raw material, the lean absorbent discharged from the tower kettle was pressurized by the absorbent circulating pump and provided heat for the methane desorption tower reboiler, thereafter, at least a portion of the second stream obtained after heat exchange was returned to the absorption tower for recycling, and at the same time, a stream of light hydrocarbon product mainly composed of C4 and C5 was withdrawn to be sent out of the boundary area and sent to the cracking furnace of an ethylene apparatus as raw material.

The method of this example obtained the enriched gas mainly composed of C2 and C3 components and the light hydrocarbon component, and their compositions and process parameters were shown in Table 6, wherein the recovery rate of the C2 and C3 components was 98.2%.

TABLE 6

| Enriched gas and light hydrocarbon component | | |
|---|---|---|
| | Enriched gas | Light hydrocarbon component |
| Temperature, ° C. | 28 | 40 |
| Pressure, MPaG | 1.52 | 3.96 |
| Mass flow, t/h | 25.99 | 15.34 |
| Composition, mol % | | |
| $CH_4$ | 0.98 | 0 |
| $C_2H_6$ | 47.34 | 0 |
| $C_3H_8$ | 43.92 | 2.31 |
| $C_4H_{10}$ | 7.66 | 79.85 |
| C5+ | 0 | 17.84 |
| $H_2O$ | 0.06 | 0 |

Comparative Example 2

The refinery dry gas in Table 5 was recovered by using the typical shallow cold oil absorption process in CN106609161B. The process adopted in Comparative Example 2 differed from Example 2 mainly in that the C4 absorbent absorption and methane desorption processes were carried out in one absorption-steaming tower, and were close in the operation pressure. Since the methane desorption process involved a relatively high pressure, the corresponding tower kettle temperature was relatively high, and low-pressure steam was used as the heat source of the tower kettle reboiler in the methane desorption process.

The method of this Comparative Example 1 obtained an enriched gas mainly composed of C2 and C3 components, whose composition was shown in Table 7, wherein the recovery rate of the C2 and C3 components was 98.2%. Comparison data between the present invention and the technical solutions of the typical shallow cold oil absorption process and cryogenic separation process were shown in Table 8.

TABLE 7

Composition of the Enriched gas

| Composition of the Enriched gas, mol % | |
|---|---|
| $CH_4$ | 4 |
| $C_2H_6$ | 45.95 |
| $C_3H_8$ | 42.54 |
| $C_4H_{10}$ | 7.42 |
| $H_2O$ | 0.09 |

TABLE 8

Comparison data between the present application and the prior art

| | Present invention | Typical shallow cold oil absorption process | Cryogenic separation process |
|---|---|---|---|
| Minimum temperature of process stream/° C. | 5-15 | 5-15 | −100 |
| Drying apparatus | No | No | Yes |
| Absorption tower pressure/MPaG | 3.6 | 3.6 | — |
| Methane desorption tower pressure/MPaG | 1.5 | 3.6 | — |
| Tower kettle temperature of methane desorption tower/° C. | 60 | 125 | — |
| Heating medium for tower kettle of methane desorption tower | Lean absorbent discharged from desorption tower kettle | Low-pressure steam | — |
| Load of methane desorption tower reboiler/kW | 4731 | 13500 | — |
| Total energy consumption of apparatus/kg standard oil/t raw material | 46.0 | 55.3 | — |
| Reduction of total energy consumption of apparatus/% | 16.8 | — | — |

As can be seen from Tables 6-8, the lowest temperature of the process stream of the present invention was 5-15° C., neither a low-temperature level propylene cooling capacity nor a propylene refrigeration apparatus and a drying apparatus were required, and thus the equipment investment was low. Compared with the conventional shallow cold oil absorption process, under the condition of obtaining the same high C2 and C3 recovery rate, by reducing the pressure of the methane desorption process, the present invention greatly reduced the energy consumption required for the process and at the same time reduced the grade of the heating medium, and could use the hot process stream in the apparatus to provide all the heat of the methane desorption tower, which saved the consumption of low-pressure steam introduced from outside the apparatus, and reduced the total energy consumption of the apparatus by 16.8%.

It can be illustrated by the examples that, compared with the conventional shallow cold oil absorption process, the present invention not only achieved a high recovery rate of C2 or C2 and C3, but also enabled the methane desorption tower reboiler to need only the process stream in the apparatus (the lean absorbent of the desorption tower kettle) as the heat source by adopting high-pressure absorption and low-pressure methane desorption, which reduced the material consumption and greatly saved consumption of steam and total energy consumption of the apparatus.

Various embodiments of the present invention have been described above in detail, but the above description is only exemplary and the present invention is not limited thereto. Without departing from the technical concept and scope of the present invention, various modifications can be made to the technical solutions of the present invention, including combining various technical features in any other suitable manner, and these modifications and combinations should also be regarded as the contents disclosed in the present invention, and they all belong to the protection scope of the present invention.

The invention claimed is:

1. Method for recovering C2 components in a methane-containing industrial gas, the method comprising the following steps:
   (1) compressing the methane-containing industrial gas, cooling the obtained compressed gas prior to performing gas-liquid separation, to obtain a gas phase and a liquid phase;
   (2) contacting the gas phase with an absorbent to absorb the C2 components to obtain an absorption tail gas and an absorption rich liquid, wherein,
   the absorption rich liquid is returned and mixed into the compressed gas, or
   a mixed liquid of the absorption rich liquid and the liquid phase obtained in step (1) or the absorption rich liquid is used as a first stream;
   (3) depressurizing the liquid phase obtained in step (1) or the first stream obtained in step (2);
   (4) subjecting the depressurized stream in step (3) to methane desorption to obtain a desorbed gas and a rich absorbent, and returning the desorbed gas to the compression in step (1) or discharging it externally, or
   subjecting the depressurized stream in step (3) to a second gas-liquid separation to obtain a second gas phase and a second liquid phase, returning the second gas phase to the compression in step (1), subjecting the second liquid phase to methane desorption to obtain a desorbed gas and a rich absorbent, and returning the desorbed gas to the compression in step (1) or discharging it externally;
   (5) subjecting the rich absorbent to desorption separation to obtain a lean absorbent and an enriched gas containing the C2 components, the lean absorbent being returned and mixed into the absorbent in step (2).

2. The method according to claim 1, wherein the methane-containing industrial gas includes dry gas, cracked gas, natural gas, and shale gas.

3. The method according to claim 1, wherein in step (2), the absorption rich liquid is returned and mixed into the compressed gas, and the liquid phase obtained in the step (1) is depressurized and then subjected to methane desorption to obtain a desorbed gas and a rich absorbent.

4. The method according to claim 3, wherein a pressure of the compressed gas is 2.5-4.6 MPaG;
   the compression is a multi-stage compression;
   a temperature of the cooling is 5-40° C., the cooling uses a cooling medium having a temperature of 0° C. or higher, and the cooling medium is at least one selected from the group consisting of low-temperature water, circulating water, propylene, ammonia and liquid nitrogen.

5. The method according to claim 3, wherein the absorption of the C2 components is carried out in an absorption tower;
   parameters of the absorption tower include: a theoretical plate number of 15-30, an operation pressure of 2.5-4.6 MPaG, a tower top temperature of 10-60° C., and a tower kettle temperature of 10-70° C.

6. The method according to claim 3, wherein the methane desorption is carried out in a methane desorption tower,
parameters of the methane desorption tower include: a theoretical plate number of 20-50, an operation pressure of 0.5-2.4 MPaG, a tower top temperature of 10-60° C., and a tower kettle temperature of 35-90° C.;
a pressure of the liquid phase after depressurization is 0.8-3 MPaG.

7. The method according to claim 3, wherein the desorption separation is carried out in a desorption tower,
parameters of the desorption tower include: a theoretical plate number of 20-50, an operation pressure of 1-2.8 MPaG, a tower top temperature of 25-70° C., and a tower kettle temperature of 90-160° C.

8. The method according to claim 3, wherein the lean absorbent is used as a heat source of the methane desorption, and at least a portion of the stream obtained after heat exchange is returned and mixed into the absorbent.

9. The method according to claim 1, wherein the method further comprises recovering C3 components, and the C3 components comprise propane and/or propylene.

10. The method according to claim 1, wherein the first stream obtained in step (2) is depressurized and then subjected to a second gas-liquid separation to obtain a second gas phase and a second liquid phase, and the second liquid phase is subjected to methane desorption to obtain a desorbed gas and a rich absorbent.

11. The method according to claim 10, wherein a pressure of the compressed gas is 2.5-5 MPaG;
the compression is a multi-stage compression;
a temperature of the cooling is 5-45° C., the cooling uses a cooling medium having a temperature of 0° C. or higher, and the cooling medium is at least one selected from the group consisting of low-temperature water, circulating water, propylene, ammonia and liquid nitrogen.

12. The method according to claim 10, wherein absorption of C2 and C3 components is carried out in an absorption tower;
parameters of the absorption tower include: a theoretical plate number of 15-30, an operation pressure of 2.5-5 MPaG, a tower top temperature of 10-30° C., and a tower kettle temperature of 10-60° C.;
a pressure of the first stream after depressurization is 0.5-2.4 MPaG;
before/after the depressurization of the first steam, said first stream is subjected to cooling treatment, and a temperature of said first stream after cooling is 5-40° C.

13. The method according to claim 10, wherein the methane desorption is carried out in a methane desorption tower,
parameters of the methane desorption tower include: a theoretical plate number of 20-50, an operation pressure of 0.5-2.4 MPaG, a tower top temperature of 10-40° C., and a tower kettle temperature of 35-100° C.

14. The method according to claim 10, wherein the desorption separation is carried out in a desorption tower,
parameters of the desorption tower include: a theoretical plate number of 20-50, an operation pressure of 1-2.8 MPaG, a tower top temperature of 15-70° C., and a tower kettle temperature of 90-200° C.

15. The method according to claim 10, wherein the lean absorbent is used as a heat source of the methane desorption, and at least a portion of the second stream obtained after heat exchange is returned and mixed into the absorbent.

16. The method according to claim 6, wherein the heat source of the tower kettle of the methane desorption tower is provided by a methane desorption tower reboiler, and a heat source of the methane desorption tower reboiler is a process stream; the process stream is at least one selected from the group consisting of the absorbent, the rich absorbent and the lean absorbent.

17. The method according to claim 1, wherein the absorbent is selected from C4 fractions and/or C5 fractions, the C4 fractions comprise at least one selected from the group consisting of n-butane, isobutane and butene, and the C5 fractions comprise at least one selected from the group consisting of n-pentane, isopentane and neopentane.

18. The method according to claim 1, wherein the method further comprises recovering C4 components, and the C4 components comprise butane and/or butene.

19. The method according to claim 5, wherein a temperature of the absorbent entering the tower is 40-50° C., a temperature of the gas phase entering the tower is 40° C., the cooling medium in step (1) is circulating water, and the tower top temperature of the absorption tower is 40-60° C.

20. The method according to claim 5, wherein a temperature of the absorbent entering the tower is 5-20° C., a temperature of the gas phase entering the tower is 5-20° C., the cooling medium in step (1) is low-temperature water, and the tower top temperature of the absorption tower is 10-30° C.

21. Apparatus for recovering C2 components in a methane-containing industrial gas, the Apparatus comprising: a compressor, a cooler, a liquid separation tank, an absorption tower, a methane desorption tower and a desorption tower;
the compressor is connected to a pipeline of a methane-containing industrial gas, and the compressor, the cooler and the liquid separation tank are connected in sequence;
the absorption tower has its bottom respectively connected to the top of the liquid separation tank and the cooler, for contacting a gas phase discharged from the top of the liquid separation tank with an absorbent in countercurrent, an absorption tail gas is discharged from the top of the absorption tower, and an absorption rich liquid is discharged from the tower kettle of the absorption tower and returned to the cooler;
the methane desorption tower has its upper part, top and bottom respectively connected to the bottom of the liquid separation tank, the compressor and an middle part of the desorption tower, for methane desorption of the liquid phase discharged from the bottom of the liquid separation tank after depressurization, a desorbed gas is discharged from the top of the methane desorption tower and returned to an inlet or interstage of the compressor or discharged externally, and a rich absorbent is discharged from the tower kettle of the methane desorption tower and then passed into the middle part of the desorption tower for desorption separation;
the desorption tower has its bottom connected to the top of the absorption tower, a lean absorbent is discharged from the tower kettle of the desorption tower and is returned to the top of the absorption tower, and an enriched gas comprising C2 components, such as C2 and C3 components, is recovered from the top of the desorption tower.

22. Apparatus for recovering C2 components in a methane-containing industrial gas, the apparatus comprising: a compressor, a cooler, a first liquid separation tank, an absorption tower, a second liquid separation tank, a methane desorption tower and a desorption tower;

the compressor is connected to a pipeline of a methane-containing industrial gas, and the compressor, the cooler and the first liquid separation tank are connected in sequence;

the absorption tower has its bottom respectively connected to the top of the first liquid separation tank and a middle part of the second liquid separation tank, for contacting a first gas phase discharged from the top of the first liquid separation tank with an absorbent in countercurrent, an absorption tail gas and an absorption rich liquid are respectively discharged from the top and tower kettle of the absorption tower, a mixed liquid of the absorption rich liquid and a first liquid phase discharged from the bottom of the first liquid separation tank or the absorption rich liquid is used as a first stream, and the first stream is depressurized and then passed into the middle part of the second liquid separation tank for a second gas-liquid separation;

the second liquid separation tank has its top and bottom respectively connected to the compressor and the upper part of the methane desorption tower, a second gas phase is discharged from the top of the second liquid separation tank and returned to an inlet or interstage of the compressor, and a second liquid phase is discharged from the bottom of the second liquid separation tank and passed into the upper part of the methane desorption tower for methane desorption;

the methane desorption tower has its top and bottom respectively connected to the compressor and the middle part of the desorption tower, a desorbed gas is discharged from the top of the methane desorption tower and returned to an inlet or interstage of the compressor or discharged externally, and a rich absorbent is discharged from the tower kettle of the methane desorption tower and passed into an middle part of the desorption tower for desorption separation;

the desorption tower has its bottom connected to the top of the absorption tower, a lean absorbent is discharged from the tower kettle of the desorption tower and is returned to the top of the absorption tower, and an enriched gas comprising C2 components, such as C2 and C3 components, is recovered from the top of the desorption tower.

23. The apparatus according to claim 21, wherein the methane-containing industrial gas includes dry gas, cracked gas, natural gas, and shale gas.

24. The apparatus according to claim 21, wherein the apparatus further comprises a methane desorption tower reboiler;

the methane desorption tower reboiler is respectively connected to the bottom of the desorption tower, the lower part and the bottom of the methane desorption tower and the top of the absorption tower, for providing heat for the tower kettle of the methane desorption tower with the lean absorbent discharged from the tower kettle of the desorption tower, and at least a portion of a stream obtained after heat exchange of the lean absorbent is returned to the top of the absorption tower.

25. The method according to claim 13, wherein the heat source of the tower kettle of the methane desorption tower is provided by a methane desorption tower reboiler, and a heat source of the methane desorption tower reboiler is a process stream; the process stream is at least one selected from the group consisting of the absorbent, the rich absorbent and the lean absorbent.

26. The apparatus according to claim 22, wherein the methane-containing industrial gas includes dry gas, cracked gas, natural gas, and shale gas.

27. The apparatus according to claim 22, wherein the apparatus further comprises a methane desorption tower reboiler;

the methane desorption tower reboiler is respectively connected to the bottom of the desorption tower, the lower part and the bottom of the methane desorption tower and the top of the absorption tower, for providing heat for the tower kettle of the methane desorption tower with the lean absorbent discharged from the tower kettle of the desorption tower, and at least a portion of a stream obtained after heat exchange of the lean absorbent is returned to the top of the absorption tower.

* * * * *